United States Patent [19]

Iannarone et al.

[11] Patent Number: 4,945,548
[45] Date of Patent: Jul. 31, 1990

[54] METHOD AND APPARATUS FOR DETECTING IMPENDING OVERFLOW AND/OR UNDERRUN OF ELASTICITY BUFFER

[75] Inventors: John R. Iannarone, Tewksbury, Mass.; Bruce W. Thompson, Mount Vernon, N.H.

[73] Assignee: Digital Equipment Corporation, Maynard, Mass.

[21] Appl. No.: 257,907

[22] Filed: Oct. 14, 1988

Related U.S. Application Data

[63] Continuation-in-part of Ser. No. 187,208, Apr. 28, 1988, Pat. No. 4,878,219.

[51] Int. Cl.$^5$ .................... H04L 25/20; H04L 7/00
[52] U.S. Cl. ........................... 375/4; 375/118; 370/102
[58] Field of Search ............... 375/3, 4, 118; 358/149, 358/19; 360/51, 54; 370/102, 105, 105.3, 108, 103; 369/60

[56] References Cited

U.S. PATENT DOCUMENTS

| | | | |
|---|---|---|---|
| 4,058,672 | 11/1977 | Crager et al. | 358/257 |
| 4,058,838 | 11/1977 | Crager et al. | 358/257 |
| 4,175,287 | 11/1979 | Fuhrman | 375/118 |
| 4,195,351 | 3/1980 | Barner et al. | 364/900 |
| 4,323,790 | 4/1982 | Dunning et al. | 370/102 |
| 4,423,482 | 12/1983 | Hargrove et al. | 364/900 |
| 4,595,911 | 6/1986 | Kregness et al. | 364/200 |
| 4,606,023 | 8/1986 | Dragoo | 370/103 |
| 4,612,541 | 9/1986 | Ohnishi | 370/86 |
| 4,654,782 | 3/1987 | Bannai et al. | 364/200 |
| 4,663,748 | 5/1987 | Karbowiak et al. | 370/89 |
| 4,674,086 | 6/1987 | Szczepanek et al. | 370/86 |
| 4,692,894 | 9/1987 | Bemis | 370/84 |
| 4,696,001 | 9/1987 | Gagliardi et al. | 370/16 |
| 4,703,486 | 10/1987 | Bemis | 370/13 |
| 4,841,550 | 6/1989 | George et al. | 370/102 |

OTHER PUBLICATIONS

Computer & Business Equipment Manufacturers Association, FDDI Physical Layer Protocol (PHY), Draft Proposed American National Standard, rev. 15, Sep. 1, 1987.

*Primary Examiner*—Benedict V. Safourek
*Assistant Examiner*—Marianne Huseman
*Attorney, Agent, or Firm*—Finnegan, Henderson, Farabow, Garrett, and Dunner

[57] ABSTRACT

A parallel asynchronous elasticity buffer. Selection of the address of a storage element for writing or reading of data is provided by asynchronous input and output pointers implemented using circular gray code counters. The buffer is initialized once during transmission of each frame of data so that the pointers do not select the same storage element for writing and reading at the same time. Write overflow or read underrun of a storage element is detected before any data corruption can occur by comparing the input and output pointers. An error condition is detected if the input and output pointers overlap for a threshold period, which can be shorter than the period required for writing or reading of a multibit data unit to or from the buffer. The overlap time period is determined by comparing the pointers at one or more sampling times corresponding to selected phases of a clock signal.

88 Claims, 15 Drawing Sheets

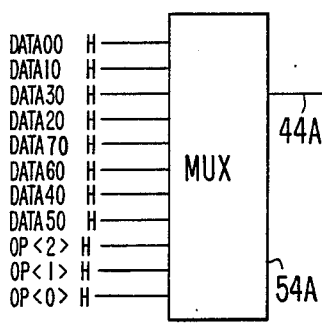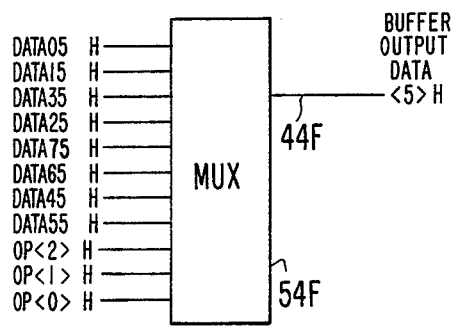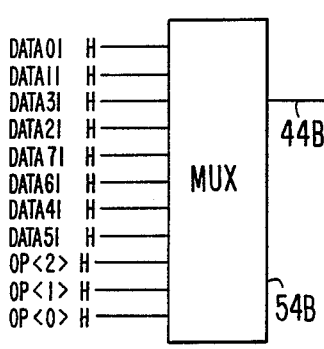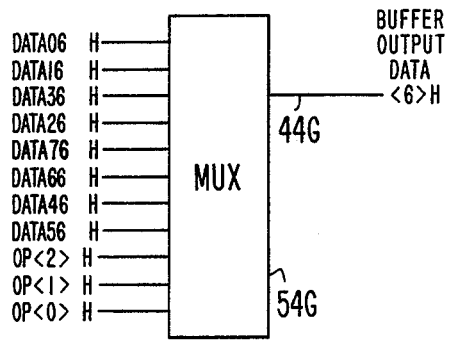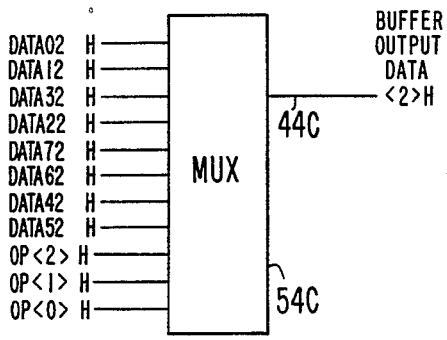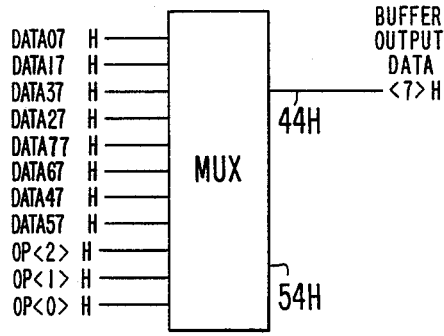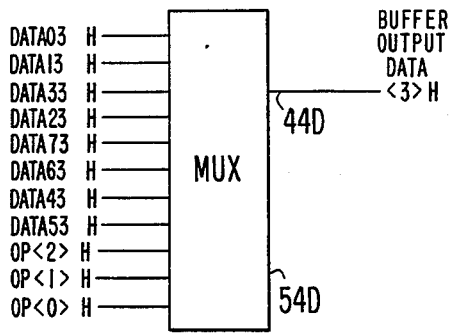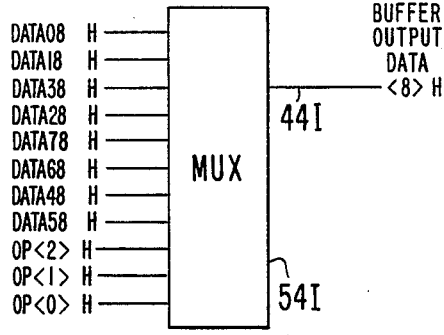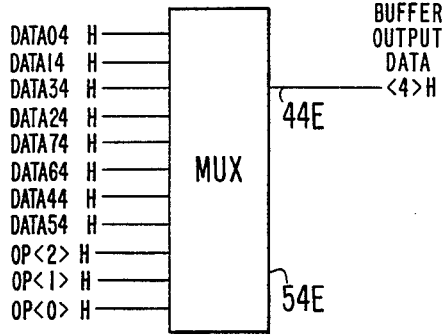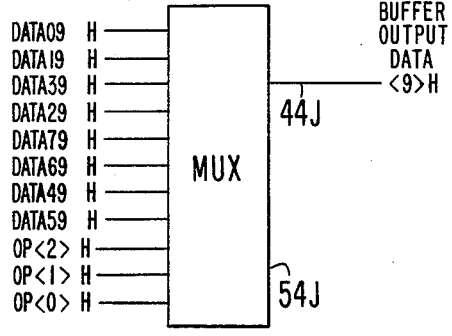
FIG. 3B OCEF = OUTPUT CONTROLLER ENABLE FLAG PRESENT.
-F8 = 7 IDLE BYTES READ.
F7 = 6 IDLE BYTES READ.
F6 = 5 IDLE BYTES READ.
F2 = 1 IDLE BYTE READ OR OP=AIM.
L = LOAD READ POINTER WITH AIM.
— = CONDITION NOT PRESENT.

METHOD AND APPARATUS FOR DETECTING IMPENDING OVERFLOW AND/OR UNDERRUN OF ELASTICITY BUFFER

RELATED APPLICATION

This application is a continuation-in-part of U.S. patent application Ser. No. 07/187,208, now U.S. Pat. No. 4,878,219, entitled "Method and Apparatus for Nodes in Network to Avoid Shrinkage of an Interframe Gap," filed Apr. 28, 1988 by Charles W. Kaufman, Mark F. Kempf, and Jerry D. Hutchinson, and which is assigned to the assignee of this application.

FIELD OF THE INVENTION

This invention is related to computer networks, and more particularly, to computer networks that transfer frames of data through receptor nodes using elasticity buffers, and in which each node connected to the network is operated by an independent clock.

BACKGROUND OF THE INVENTION

In the field of data communications, quantities of data known as "frames" are often transmitted from one node (station) to another through a network of nodes that operate using their own independent clocks. Use of independent clocks in the nodes requires a system for ensuring that data corruption will not occur when frames are transmitted from a source node to a destination node through a number of repeater nodes. One method commonly employed for preventing data corruption in such networks is the use of an elasticity buffer at each node.

An elasticity buffer is a first-in first-out storage device including a number of single or multibit storage elements. In the elasticity buffer, data enters and exits at different rates corresponding to the different frequency of the clock used in the upstream transmitting node compared with the local clock frequency used in the receiving node. Elasticity buffers are required even though data transfer rates are nominally the same, because independent clocks in separate nodes will differ in frequency within some known tolerance.

An elasticity buffer is used when the incoming data rate may vary from the outgoing data rate. The independent clocks in different nodes are asynchronous, and at some point, data from an upstream node (the sending station) must be synchronized to the local clock in the repeater node receiving the data. Typically, incoming data is received synchronously with a transmit clock signal of the upstream node. The transmit clock signal may be sent to the repeater node on a dedicated clock line, or the transmit clock signal may be recovered by the repeater node from incoming data using a clock recovery device.

After data is received by the repeater node, some implementations provide that the data is first synchronized to the local clock and then written into the storage elements of the elasticity buffer. In these systems, data is written into and read from the storage elements using the same local clock, and the buffer read/write operations are therefore synchronous.

In an elasticity buffer with synchronous read/write operations, each data unit (e.g., a byte) transferred through the elasticity buffer must first be pre-synchronized when the data unit is received by the repeater node. For synchronous elasticity buffers, however, metastability is a significant problem and may result in data corruption.

Metastability occurs when adequate setup and hold times for input data are not provided for a logic element (e.g., a flip-flop) that is latching in the data. In logic elements used for synchronization, the variation in clock speeds makes the time of arrival of each data unit uncertain, thereby causing errors when input data is sampled during a period of instability. Although failure rates may be reduced using sophisticated designs and multistage synchronizers, there is a probability of data corruption due to metastability each and every time logic elements performing the synchronization sample the signal levels on input data lines. Problems with metastability become more critical in nodes in which clock speeds are designed to approach the limits of existing device technology, because the probability of error increases as the speed at which the logic elements sample the input data lines increases. In order to reduce the probability of data corruption, it is therefore desirable to minimize the frequency at which samples of input data are taken by logic elements performing the synchronization function.

Data corruption resulting from metastability is reduced when an asynchronous elasticity buffer is used in the repeater node instead of a synchronous buffer. In the asynchronous elasticity buffer, data is written into storage elements in synchronism with the transmit clock signal, and data is read from the storage elements in synchronism with the local clock signal. Thus, the read and write operations for this elasticity buffer are totally asynchronous. As a result, there is no need to provide for sampling of each and every input data unit by a synchronizer logic element before it is written into a storage element. In repeater nodes utilizing asynchronous elasticity buffers, input data can be synchronized infrequently, e.g., once during each period when an entire frame of data is transmitted to the repeater node. Typically, input data is synchronized by the repeater node at the start of receipt of each frame of data from the upstream node.

Data is stored in an elasticity buffer as it arrives from an upstream node, and is read from the buffer for transmission to a downstream node at a rate determined by the local clock in the node. If the local clock for the repeater node is slower than the transmit clock of the upstream node, the buffer will become more and more full as the data in a frame is transmitted through the node. If the local clock is faster than the transmit clock of the upstream node, the buffer gradually empties of all data.

The elasticity buffer in a repeater node between a source node and a destination node must therefore include enough storage elements to ensure it will not become full before the last data unit in a frame has been transmitted to a downstream node. If the buffer fills before the repeater node has transmitted the last data unit to the downstream node, the buffer cannot store additional data being transmitted from an upstream node without corrupting previously received data that has not yet been transmitted to the downstream node. When data is written into a storage element that has previously been written but has not yet been read, a write overflow condition exists.

An elasticity buffer in a repeater node between a source node and a destination node must also prevent a storage element from being simultaneously written and read, or from being read before it is written. A read underrun condition exists when data is read from a storage element that has previously been read but has not yet been written. However, data corruption actually occurs before the read underrun whenever a storage element is read too soon after data is written into the storage element. Valid data cannot be read from a storage element at the same instant data is stored into the storage element. This is due to the fact that logic elements in an elasticity buffer, including the storage elements, have propagation delays and setup and hold times.

Therefore, to minimize the probability of data corruption due to a read underrun condition, a minimum delay is provided before reading of a storage element in which the first data unit in a frame has been written. Without such initialization (also referred to as resetting or recentering) of the elasticity buffer, a repeater node with a relatively fast clock empties its elasticity buffer and attempts to transmit data to the downstream node before the data has been received from the upstream node. Typically, the elasticity buffer is initialized at least once during transmission of every frame, usually at the start of receipt of each frame of data from the upstream node and/or after detecting that a write overflow or read underrun is impending.

In order to prevent any unacknowledged data corruption due to write overflow or read underrun conditions, the repeater node detect whether write overflow and/or read underrun conditions are impending. Each storage element in the elasticity buffer has a unique address. Therefore, detection of overflows/underruns can be accomplished by monitoring the write address and the read address. When the write address and read address pass each other in either direction, an overflow/underrun condition has occurred.

In nodes utilizing synchronous elasticity buffers, detecting when the write address and read address pass each other is easily accomplished because read/write operations are synchronous. In contrast, detecting an impending overflow/underrun condition is much more difficult using asynchronous elasticity buffers because the selection of the write address is not synchronous with the selection of the read address.

However, in choosing between synchronous and asynchronous elasticity buffers, it is important to recognize that overflow/underrun conditions do not occur in normal circumstances. Therefore, it is better to minimize the probability of data corruption due to metastability, which occurs even under normal conditions. For this reason, it is often preferable to use an asynchronous elasticity buffer, which will generate fewer data errors, provided a method of overflow/underrun detection can be used that is effective and efficient.

Another decision involved in design of an elasticity buffer is whether to use a serial elasticity buffer or a parallel elasticity buffer. Although data is transferred between nodes in the network in serial format, it is often necessary to design the elasticity buffer to receive and transmit data in parallel format because available technology cannot operate at the higher speeds required for serial data transfer.

In some implementations of serial asynchronous elasticity buffers, overflow/underrun detection requires storing a flag for each memory location. The flag indicates whether a read or a write operation was the most recently performed operation at that location. Potential overflows/underruns are detected whenever a read attempt is made to a location at a time when the flag for the location that is next to be read indicates a read was most recently performed, and whenever a write attempt is made to a location prior to completion of a read on the next location. Thus, overflow/underrun detection occurs whenever the read address and the write address point to storage elements that are within one location of each other.

In other implementations of serial asynchronous elasticity buffers, overflow/underrun detection requires monitoring of write select and read select lines corresponding to each data register in an elasticity buffer. An error signal is asserted whenever the write select and read select lines corresponding to two contiguous data registers are enabled. Thus, overflow/underrun detection occurs whenever the read pointer and the write pointer select data registers that are within one location of each other.

The designs used for the overflow/underrun detection in serial asynchronous elasticity buffers do not necessarily, however, provide for efficient overflow and/or underrun detection in parallel asynchronous elasticity buffers. These designs require a relatively large elasticity buffer, much of which is unused, if applied to parallel elasticity buffers.

In the serial designs, overflow/underrun detection occurs if adjacent locations are selected from reading and writing at any time. In parallel buffers, a multibit clock signal has a period corresponding to the time between transfer of each data unit. Thus, the designs described above would detect overflow/underrun for a parallel elasticity buffer even though pointers for the write and read addresses are between one and two multibit clock signal periods apart.

However, underruns and overflows do not actually occur until shortly before the write and read addresses are being simultaneously selected. Therefore, an impending overflow and/or underrun condition can be detected without risk of data corruption even when pointers for the write and read addresses are less than one multibit clock signal period apart. By providing a parallel buffer design in which overflow/underrun detection occurs later than in the serial designs, the elasticity buffer itself can be made smaller and simpler. In contrast, if the serial design is used for a parallel elasticity buffer, the buffer must be capable of storing at least one additional multibit data unit.

Furthermore, in a parallel buffer design having later overflow/underrun detection, the latency time of the buffer is reduced by making more of the buffer usable. By allowing pointers for the write and read addresses to be less than one multibit clock signal period apart, tolerances for the independent clocks in the nodes can be larger because more clock slippage is required before the buffer detects that an overflow and/or underrun condition is impending.

The principles discussed above apply to various types of wide and local area networks, including any packet data network which connects many repeater nodes that involves point-to-point clocking. Examples include nodes connected to a token ring network or to an Ethernet network connected with multiple repeaters.

A ring network consists of a set of nodes (stations) logically connected as a serial string of nodes and transmission media to form a closed loop. Information is transmitted sequentially, as a stream of suitably encoded symbols, from one active node to the next. Each node generally regenerates and repeats each symbol and serves as the means for attaching one or more devices to the network for the purpose of communicating with other devices on the network.

A network of particular applicability is the fiber distributed data interface (FDDI), which is a proposed American National Standard for a 100 megabit per second token ring using an optical fiber medium. The characteristics of FDDI networks are described in detail by Floyd E. Ross in "FDDI—A Tutorial," IEEE *Communications Magazine,* Vol. 24, No. 5, pp. 10–17 (May 1986), which is herein incorporated by reference.

Information is transmitted on an FDDI ring network in frames using a four of five group code, with each five-bit code group being called a symbol. Of the thirty-two member symbol set, sixteen are data symbols each representing four bits of ordered binary data, three are used for starting and ending delimiters, two are used as control indicators, and three are used for line-state signaling recognized by physical layer hardware. Each byte corresponds to two symbols or ten bits. (The term multibit data unit is used throughout the specification as a convenient way to refer to any unit of data exceeding one bit in length; the functioning of the invention is not limited to any particular number of bits in the data unit, and such units of data as symbols and bytes are included.)

The data transmission rate is 100 megabits per second for FDDI. A 125 megabaud transmission rate is required because of the use of a four-of-five code on the optical fiber medium. The nature of the clocking limits data frames to a maximum length of 4,500 bytes (i.e., 9,000 symbols or 45,000 bits). An FDDI network consists of a theoretically unlimited number of connected nodes.

In FDDI networks, every transmission of a frame is preceded by a preamble field, which consists of idle line-state bytes (symbols). In FDDI, an idle line-state symbol corresponds to the five-bit code group 11111. At the beginning of the frame, the preamble field of idle bytes is followed by a starting delimiter field, which consists of a two-symbol sequence JK that is uniquely recognizable independent of previously established symbol boundaries. The starting delimiter field establishes the symbol boundaries for the content that follows. The five-bit code group corresponding to the symbol J is 11000, and the code group corresponding to the symbol K is 10001.

For FDDI, the nominal clock rate is 125 megahertz but a frequency tolerance of plus or minus 0.005% is allowed. The maximum frame size is 4,500 bytes. Given these constraints, it is readily understood that passage of a single frame may result in the elasticity buffer in a repeater node filling or emptying at the rate of 4.5 bits per frame because of the maximum possible difference in clock frequencies in consecutive nodes in the network.

As has been described previously, the elasticity buffer in each node in a network compensates for any differences in rates of the clocks for consecutive nodes in the network. When initialization of the elasticity buffer occurs before a subsequent frame is repeated by a node, the node will either insert or delete bytes from the total number of bytes it transmits to the downstream node, depending on whether the clock in the upstream node is slower or fastern than the local clock for the node. By providing a preamble before each frame including at least a minimum number of idle bytes, the elasticity buffer can be initialized without any loss of data by only allowing addition or deletion of idle bytes in the preamble separating every pair of frames.

Therefore, in order to prevent allowable clock frequency differences from causing the elasticity buffer in a node from completely filling or emptying, the repeater node initializes its elasticity buffer by either expanding or shrinking the size of the preamble for the subsequent frame. Thus, one idle byte may be inserted in a preamble by a fast repeater node when it initializes to prevent its elasticity buffer from emptying, while one idle byte may be deleted by a slow repeater node when it initializes its elasticity buffer in order to prevent it from filling.

The FDDI network has a maximum frame size of 4,500 bytes and a clock tolerance of plus or minus 0.005%, so that a node will have to add or delete no more than 4.5 bits if it initializes its elasticity buffer following transmission of a frame. Therefore, additional bits of storage must be provided in the elasticity buffer to accomodate for differences in data transfer rates. Although a slippage of 4.5 bits reflects the maximum clock frequency differences from the nominal frequency for all stations in the network, this does not prevent the relative position of the input and output pointers from varying outside a range of 4.5 bits. Nodes do not add or delete fractions of bits from frames repeated to downstream nodes because of the technical complexity and the resulting addition to the jitter seen at the downstream node due to a frequency shift for the duration of one bit. Instead, the node rounds the number of bits it adds or deletes to the nearest whole bit, and these roundoff errors can accumulate along the network. Furthermore, standards for nodes connected to a network such as FDDI do not specify a maximum roundoff error, and designers therefore plan implementations of nodes that round to the nearest byte (ten bits) or symbol (five bits). This increases the size of the roundoff errors.

An elasticity buffer is therefore required which reduces the number of data errors that will occur due to metastability but which will also detect impending overflow and/or underrun conditions in an effective and efficient manner. Furthermore, the buffer must be practical for use in nodes coupled to any of a variety of data communication networks.

Thus, there is a need for a method and apparatus for detecting impending overflow and/or underrun of a parallel asynchronous elasticity buffer.

SUMMARY OF THE INVENTION

It is an object of the present invention to overcome certain problems and disadvantages of the prior art relating to metastability or to detection of impending overflow and/or underrun of an elasticity buffer. It is therefore desirable to provide a method and apparatus for detecting impending overflow and/or underrun using a parallel asynchronous elasticity buffer.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, a parallel asynchronous elasticity buffer is provided in a repeater node for transferring data in a data communication system. The data communication system includes a number of nodes coupled in a network for transferring frames of data from a source node to a destination node through the repeater node. The repeater node receives a number of bits of data in a frame from an upstream node and transmits the data to a downstream node. Each node in the network transmits data in synchronism with an independent clock.

The elasticity buffer includes receiving means for providing in parallel format, in response to a transmit multibit clock signal that is in synchronism with an independent clock of the upstream node, a multibit data unit received from the upstream node. Storage means is provided and includes a fixed number of multibit storage elements, coupled to the receiving means, for storing the multibit data unit in parallel format in one of the storage elements, wherein each storage element has a unique address. Transmitting means is coupled to the storage means for outputting in parallel format, in response to a local multibit clock signal that is in synchronism with the independent clock of the repeater node, one of the multibit data units stored in the storage means. The buffer includes write pointer means, coupled to the storage means, for selecting as a write address the address of a storage element to store the next multibit data unit provided by the receiving means; and read pointer means, coupled to the storage means, for selecting as a read address the address of a storage element to provide the next multibit data unit output by the transmitting means, wherein each multibit data unit is output in first-in, first-out order. Initialization means is provided for initializing the elasticity buffer to prevent simultaneous selection of the same address as a read address and a write address, wherein in response to initialization, a write address is selected as a read address after a predetermined delay. The buffer also includes detection means for detecting whether an error condition corresponding to a write overflow or read underrun of a storage element is impending by determining whether the same address is selected as the write address and as the read address during an overlap time period having a duration equal to a threshold time period.

The accompanying drawings, which are incorporated in and constitute a part of this specification, illustrate one preferred embodiment of the invention, and, together with the description, serve to explain the principles of the invention.

BRIEF DESCRIPTION OF THE DRAWINGS

FIGS. 3A and 3B are schematic diagrams of storage circuitry.

DESCRIPTION OF THE PREFERRED EMBODIMENTS

Reference will now be made in detail to the preferred embodiments of the invention, examples of which are illustrated in the accompanying drawings.

Figure 1:
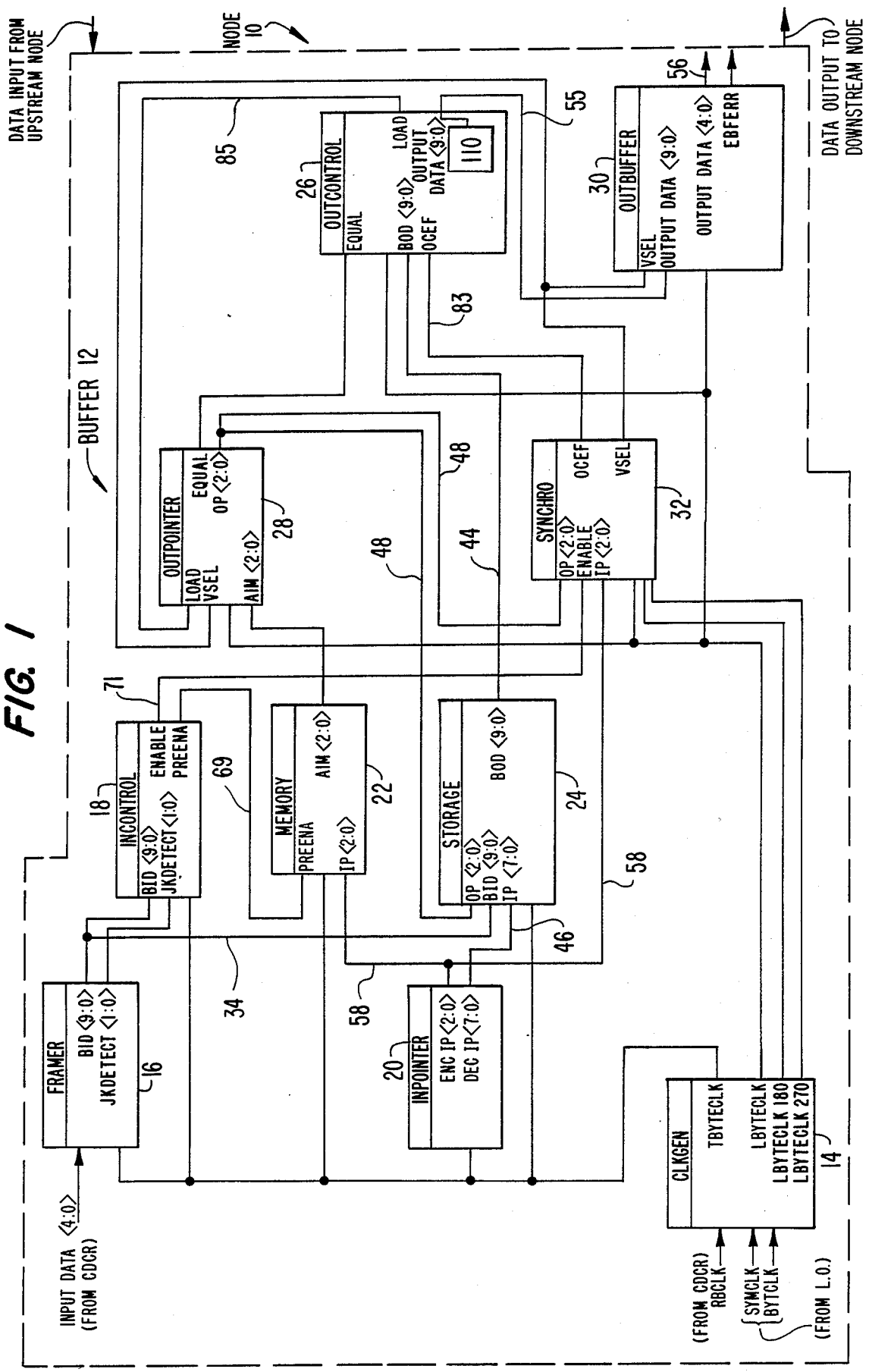
FIG. 1 is a block diagram of a repeater node.

A preferred embodiment of the repeater node is shown in FIG. 1 and is represented generally by the numeral 10. The repeater node is provided in a data communication system, which includes a number of nodes coupled in a network for transferring frames of data from a source node to a destination node through the repeater node. The repeater node receives a number of bits of data in a frame from an upstream node and transmits the number of bits of data in the frame to a downstream node. Each node in the network transmits data in serial format in synchronism with its own independent clock.

In accordance with the invention, the repeater node includes a parallel asynchronous elasticity buffer. The buffer is represented generally by the numeral 12 in FIG. 1.

Repeater node 10 may include means for providing a transmit multibit clock signal that is in synchronism with the independent clock of the upstream node, and means for providing a local multibit clock signal that is in sychronism with the independent clock of repeater node 10. In a preferred embodiment of node 10, a transmit byte clock signal (TBYTECLK) corresponds to the transmit multibit clock signal, and a local byte clock signal (LBYTECLK) corresponds to the local multibit clock signal. Preferably, the transmit byte clock signal and local byte signal are provided by clock generator circuitry 14, shown in FIG. 1.

As shown in the embodiment of FIG. 1, parallel asynchronous elasticity buffer 12 is provided with the transmit byte clock signal and the local byte clock signal by clock generator circuitry 14. A local oscillator circuit (not shown) in repeater node 10 generates a 12.5 megahertz TTL-compatible signal corresponding to a byte clock signal (BYTCLK) and a 25 megahertz TTL-compatible signal corresponding to a symbol clock signal (SYMCLK) as inputs to clock generator circuitry 14. A clock and data conversion chip (not shown) in repeater node 10 provides a 12.5 megahertz TTL-compatible signal corresponding to a recovered byte clock signal (RBCLK) as another input to clock generator circuitry 14.

In a preferred embodiment, repeater node 10 is coupled to a token ring network, such as a network in which data communication is performed in accordance with the FDDI protocol. As embodied herein, repeater node 10 receives and transmits data in accordance with the FDDI protocol.

In the FDDI protocol, the period of the local byte clock signal for each node is nominally equal to the period during which ten individual bits of data (comprising one byte or two symbols) are serially transferred between two nodes. The time required for serial transfer of each individual bit of data is referred to as a "bit time." Therefore, in a preferred embodiment of the invention, the transmit and local multibit clock signals have periods equal to ten bit times, and the symbol clock signal has a period equal to five bit times.

In a preferred embodiment of the invention, data is written into elasticity buffer 12 using the transmit byte clock signal provided by clock generator circuitry 14, and data is read from elasticity buffer 12 using the local byte clock signal provided by clock generator circuitry 14. As embodied herein, the transmit byte clock signal is used to drive a framer 16, a write (input) controller 18, a write (input) pointer 20, a temporary address memory 22, and a number of multibit storage elements 24. The local byte clock signal is used to drive a read (output) controller 26, a read (output) pointer 28, a read (output) buffer 30, and a synchronizer 32.

In accordance with the invention, the elasticity buffer includes receiving means for providing in parallel format, in response to a transmit multibit clock signal that is in synchronism with an independent clock of the upstream node, a multibit data unit having a fixed number of bits of data received from the upstream node. In a preferred embodiment, this means is provided by ten buffer input data lines 34 (FIGS. 1 and 2) and may also include framer 16.

Input data is clocked into framer 16 from the clock and data conversion chip one symbol (five bits) at a time using both the rising (TBYTECLK H) and falling (TBYTECLK L) edges of the transmit byte clock signal from clock generator circuitry 14. Framer 16 accepts five-bit wide parallel data from the clock and data conversion chip (not shown). The clock and data conversion chip in repeater node 10 receives input data from the upstream node and provides TTL-compatible data to framer 16 synchronously with the rising edge of the transmit byte clock signal. With each rising edge of the transmit byte clock signal, one byte of data is clocked out of framer 16 onto ten buffer input data lines 34 for input to one multibit storage element 24.

Figure 2:
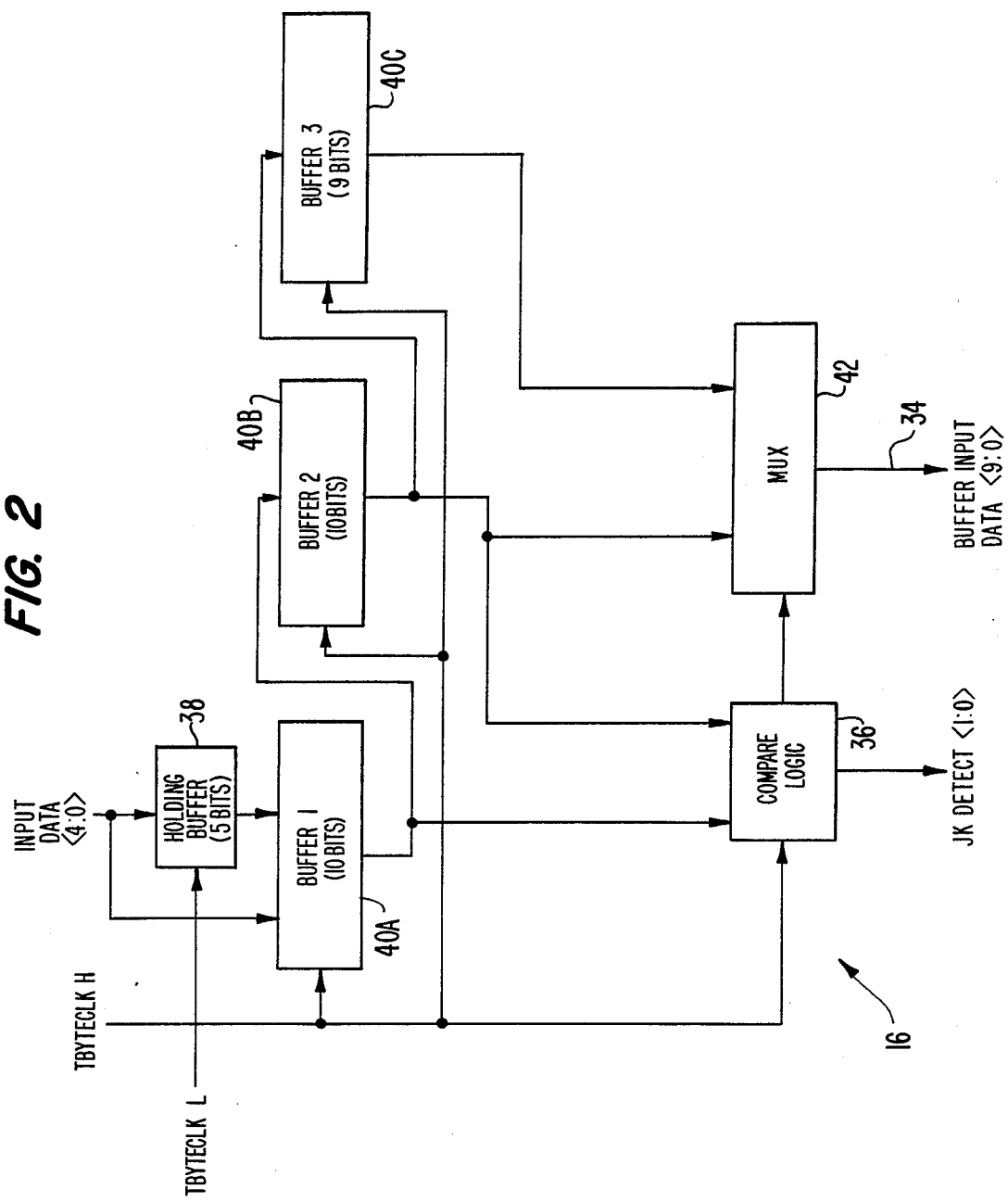
FIG. 2 is a schematic diagram of a framer.

FIG. 2 shows the structure for framer 16 in repeater node 10, which is coupled to an FDDI network. Generally, incoming data to elasticity buffer 12 is not framed into proper FDDI symbols. For this reason, framer 16 is at the input stage of elasticity buffer 12 to align input data to form proper symbols before input data is transferred through the elasticity buffer.

The elasticity buffer of the present invention may include means for detecting receipt by the repeater node of a first multibit data unit of a frame from the upstream node. Preferably, this detecting means is provided by compare logic 36 in framer 16. In the FDDI protocol, the first byte in a new frame contains a starting delimiter consisting of the symbols J and K. Compare logic 36 detects the presence of the starting delimiter at the beginning of each frame. Framer 16 uses the starting delimiter to determine proper symbol boundaries for input data received from the upstream node.

In addition to compare logic 36, framer 16 includes a symbol (five bit) wide holding register 38, a 29-bit wide three-part shift register 40, and a multiplexer 42. When a first symbol of input data from the clock and data conversion chip is clocked into framer 16, the first symbol is stored in symbol-wide holding register 38 on the falling edge (TBYTECLK L) of the transmit byte clock signal. On the rising edge (TBYTECLK H) of the transmit byte clock signal, a second symbol from the clock and data conversion chip, together with the first symbol stored in holding register 38, are shifted into a first part 40A of shift register 40, which is one byte (ten bits) wide. At the same time, data previously stored in shift register part 40A is shifted into a shift register part 40B, which is also one byte wide, and the nine least significant bits of data previously stored in shift register 40B are shifted into a shift register part 40C, which is nine bits wide. Any data previously stored in shift register part 40C, as well as the most significant bit previously stored in shift register part 40B, is discarded on the rising edge of the transmit byte clock signal.

In the FDDI protocol, the starting delimiter field at the start of each frame consists of the JK symbol pair, which corresponds to the code group 1100010001. Compare logic 36 is coupled to shift register parts 40A and 40B and checks for the presence of this ten-bit starting delimiter code group. The starting delimiter code group first appears in one of ten possible paths (i.e., shift register bits 0–9, 1–10, 2–11, . . . , or 9–18). When compare logic 36 detects the presence of the starting delimiter code group in one of these ten paths, a JK detect signal is provided by compare logic 36 to write (input) controller 18 on two lines.

In framer 16, after detection of a starting delimiter, the appropriate path within the framer is selected so that the input data received from the upstream node can correctly be provided as buffer input data to one storage element 24. On the next rising edge of the transmit byte clock signal, an output path is selected that corresponds to the particular bits in shift register 40 in which the starting delimiter was detected. Multiplexer 42 establishes the appropriate output path by selecting a group of ten consecutive bits in shift register parts 40B and 40C for output on ten buffer input data lines 34. Once an output path is selected by multiplexer 42, it remains selected until a starting delimiter is detected in one of the other nine groups of shift register bits.

In accordance with the invention, elasticity buffer 12 has storage means including a fixed number of multibit storage elements, coupled to the receiving means, for storing the multibit data unit in parallel format in one of the storage elements, wherein each storage element has a unique address. As embodied herein, the storage means is provided by at least four and preferably eight multibit storage elements 24, each of which stores one byte (ten bits) of data.

Figure 3A:
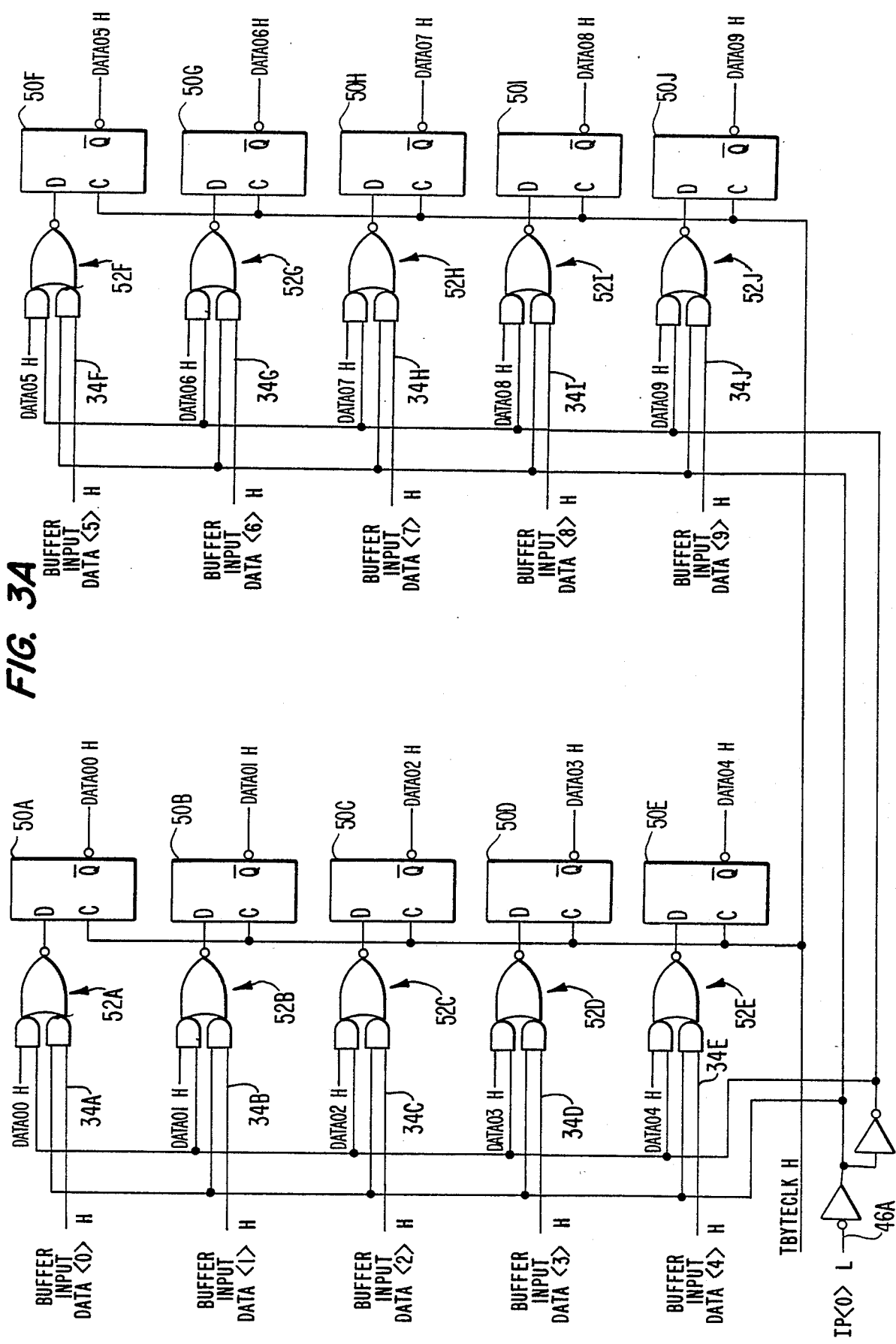

As shown in FIGS. 3A and 3B, in a preferred embodiment of the storage means one byte of buffer output data is provided on ten buffer output data lines 44A–44J for subsequent transmission to a downstream node. The storage means receives as inputs the transmit byte clock signal, one byte of buffer input data received from the upstream node on buffer input data lines 34, a write address on eight (decoded) write address selection lines 46, and a read address on three (encoded) read address selection lines 48.

A preferred structure for one of the eight storage elements 24 is shown in FIG. 3A. Storage element 24 includes ten flip-flops 50A–50J, each flip-flop storing one of the ten bits in a byte of data. When the unique address corresponding to this storage element is selected as a write address, a signal is provided on decoded write address selection line 46 coupled to that storage element, and no signals are provided on the other seven decoded write address selection lines. The providing of a signal on this write address selection line causes enable logic 52 to couple each buffer input data line 34 to a corresponding flip-flop 50. As a result, a byte of input data is written into storage element 24 when the flip-flops are clocked by the transmit byte clock signal.

Preferably, ten multiplexers 54 are provided, as shown in FIG. 3B, to select one of eight storage elements 24 for coupling to buffer output lines 44. One multiplexer 54 is coupled to each buffer output data line 44 and corresponds to a single bit in the multibit data unit. Each multiplexer 54 receives one bit from each one of the eight storage elements 24. In a preferred embodiment, three encoded read address selection lines 48 are used to designate the read address and are also input to multiplexers 54. The read address corresponds to the unique address of one selected storage element 24, and multiplexers 54 respond by coupling flip-flops 50 of the selected storage element 24 to buffer output data lines 44.

In accordance with the invention, parallel asynchronous elasticity buffer 12 includes transmitting means, coupled to the storage means, for providing in parallel format, in response to a local multibit clock signal that is in synchronism with the independent clock of the repeater node, one of the multibit data units stored in the storage means. Preferably, the transmitting means is provided by ten buffer output data lines 44 shown in FIG. 1, and may also include read (output) controller 26 and read (output) buffer 30.

In a preferred embodiment, repeater node 10 may include read (output) buffer 30. As shown in FIG. 1, buffer 30 receives ten bits of output data over lines 55 from read controller 26. Read controller 26 receives one byte of data from the storage means on ten buffer output data lines 44. The read controller is provided between the storage means and buffer 30 to add additional idle bytes to the preamble under certain circumstances in order to expand the gap between two frames. Output logic (not shown) in controller 26 either provides the buffer output data from the storage means to buffer 30, or else responds to a force signal by providing an idle line-state byte to buffer 30.

On each falling edge of the local byte clock signal, the output data from read controller 26 is loaded into an input stage of buffer 30. On the rising edge of the byte clock signal (BYTCLK H), output data in the input stage of buffer 30 is then clocked into an output stage of buffer 30. In this way, output data is retimed from the local byte clock signal provided by clock generator circuitry 14 to the byte clock signal provided by the local ocillator in node 10. On the rising edge of the byte clock signal, the five most significant bits in one byte (i.e., the high order symbol) are provided from the output stage of buffer 30 on five output lines 56 for one symbol time. On the falling edge of the byte clock signal, the five least significant bits in the byte (i.e., the low order symbol) are provided from the output stage of buffer 30 on output lines 56 for one symbol time.

In accordance with the invention, there is provided write pointer means, coupled to the storage means, for selecting as a write address the address of a storage element to store the next multibit data unit provided by the receiving means. As embodied herein, the write pointer means may correspond to write (input) pointer 20.

In a preferred embodiment, write (input) pointer 20 is a counter clocked by the transmit byte clock signal. Write pointer 20 generates a write address corresponding to the address of one selected storage element 24 by incrementing the input pointer count in response to the transmit byte clock signal. Pointer 20 provides the write address to each of eight storage elements 24 on eight decoded write address selection lines 46, and also provides the write address to temporary memory 22 and synchronizer 32 on three encoded write address selection lines 58A–58C.

Figure 4:
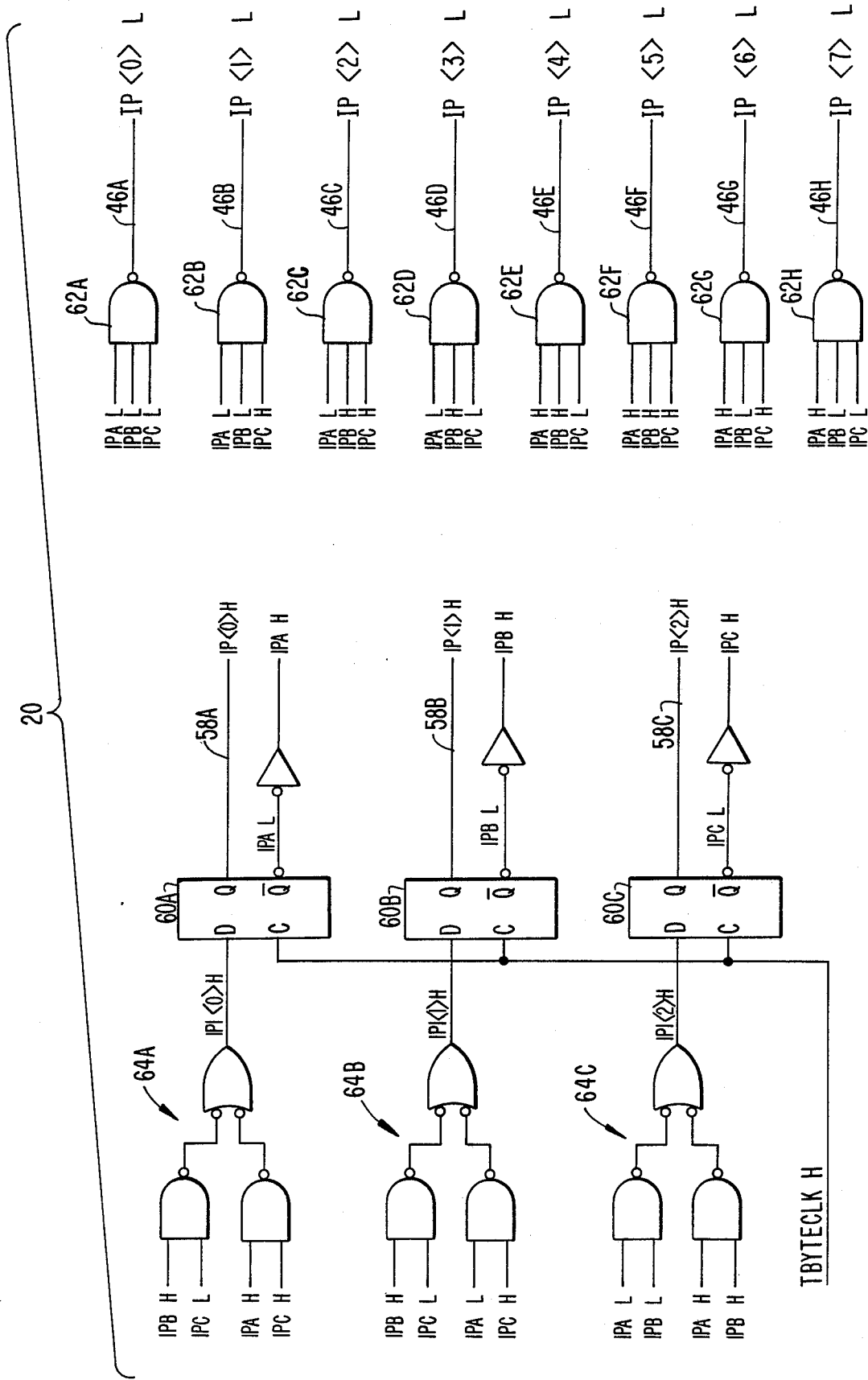
FIG. 4 is a schematic diagram of an input pointer.

A preferred structure for write pointer 20 is shown in FIG. 4. Write pointer 20 is a free running 3-bit counter having eight possible states. Each state corresponds to a unique address designating a single storage element 24 to store the buffer input data on lines 34. Flip-flops 60A–60C provide a three-bit input pointer count (IP) as the write address on three encoded write address selection lines 58A–58C. The outputs from flip-flops 60 are also supplied as inputs to decoder logic 62, which decodes the three-bit write address and provides a signal on only one of the eight decoded write address selection lines 46A–46H.

As embodied herein and as shown in FIG. 4, write pointer 20 is a gray code counter. Counter logic 64 generates the next write address for input to flip-flops 60 by using the input pointer count (IP) currently output by flip-flops 60. Counter logic 64 changes the state of one and only one bit of the input pointer count (IP). The count proceeds in a sequence such as the following: 000, 001, 011, 010, 110, 111, 101, 100, and then returns to 000.

The invention includes read pointer means, coupled to the storage means, for selecting as a read address the address of a storage element to provide the next multibit data unit output by the transmitting means, wherein each multibit data unit is output in first-in, first-out order. Preferably, the read pointer means is provided by read (output) pointer 28.

Figure 5:
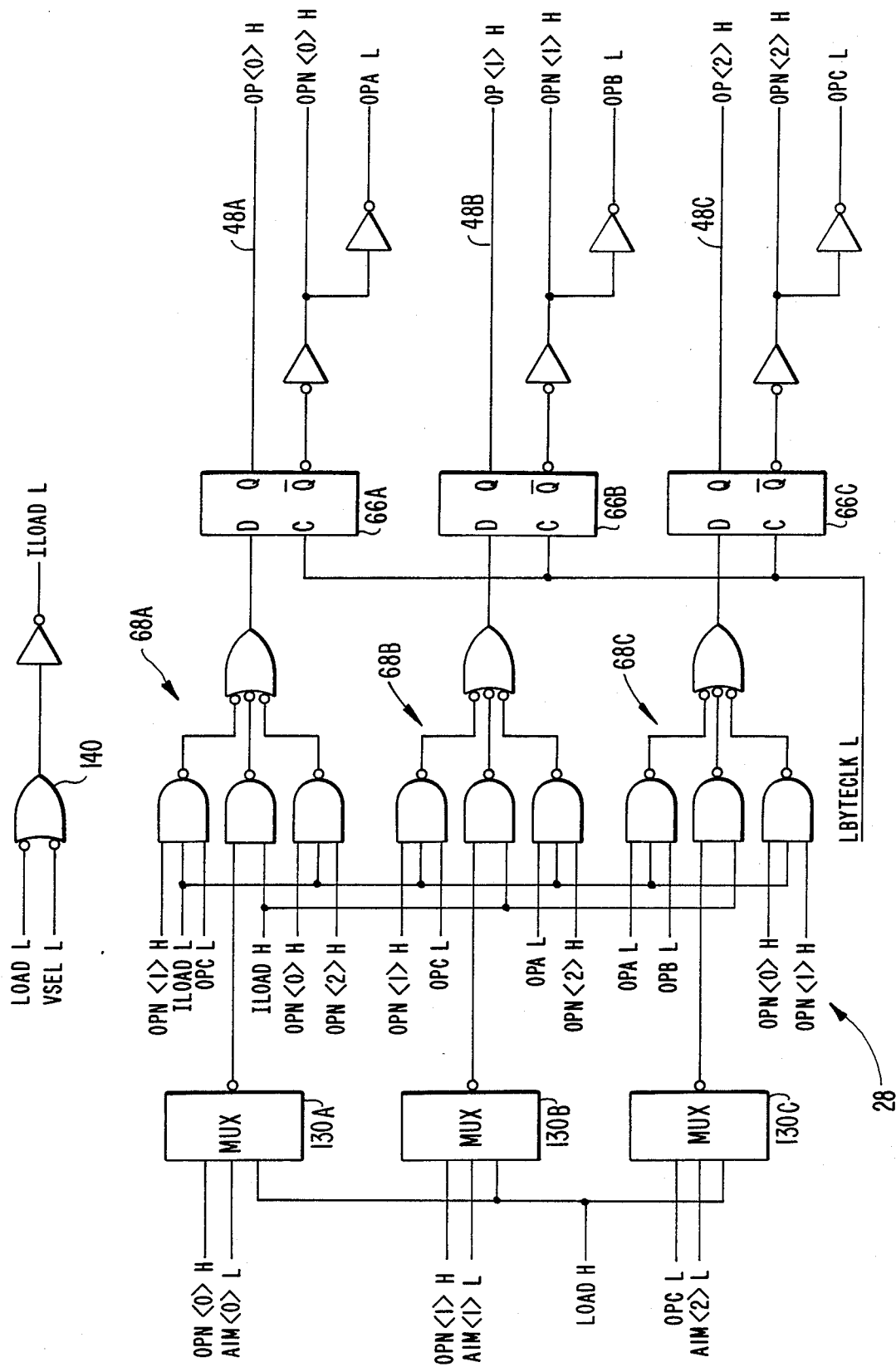
FIG. 5 is a schematic diagram of an output pointer.

In a preferred embodiment shown in FIG. 5, read (output) pointer 28 is a loadable counter clocked by local byte clock signal LBYTECLK. Read pointer 28 increments the output pointer count (OP) in response to local byte clock signal LBYTECLK, and selects a single on of eight storage elements 24 to provide the next byte of buffer output data on buffer output data lines 44. Flip-flops 66A–66C provide a three-bit output pointer count (OP) as the read address on three encoded read address selection lines 48A–48C to multiplexers 54, which select the bits stored in one of the eight storage elements for output. The read address on encoded read address selection lines 48 is also provided to synchronizer 32.

As embodied herein, read pointer 28 is a gray code counter. Counter logic 68 generates the next read address for input to three flip-flops 66 using the output pointer count (OP) currently output by flip-flops 66. Counter logic 68 changes the state of one and only one bit of the output pointer count (OP).

In the present invention, initialization means is provided for initializing the elasticity buffer to prevent simultaneous selection of the same address as a read address and a write address, wherein in response to initialization, a write address is selected as a read address after a predetermined delay. In a preferred embodiment, the initialization means may include synchronizer 32, write (input) controller 18, and read (output) controller 26.

Figure 6:
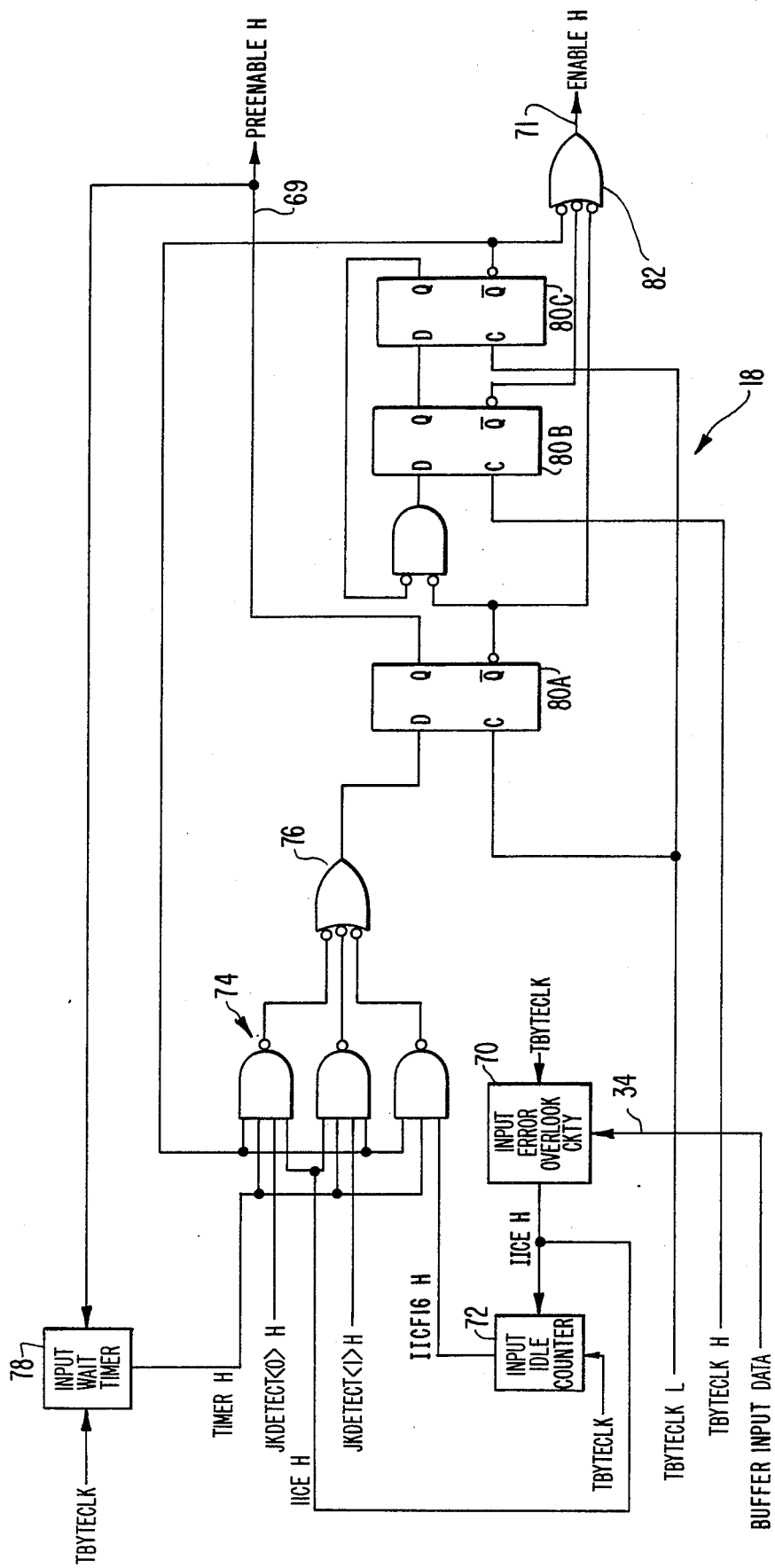
FIG. 6 is a schematic diagram of an input controller.

A preferred embodiment of write (input) controller 18 is shown in FIG. 6. Controller 18 receives the JK detect signal provided by compare logic 36 in framer 16, the buffer input data provided on ten buffer input data lines 34 by multiplexer 42 in framer 16, and the transmit byte clock signal TBYTECLK provided by clock generator circuitry 14. A function of write (input) controller 18 is to detect the presence of two conditions which result in resetting of elasticity buffer 12. Controller 18 generates an enable signal which is provided to synchronizer 32 on line 71 and a pre-enable signal which is provided to temporary address memory 22 on line 69.

As shown in FIG. 6, write controller 18 includes input error overlook circuitry 70. Error overlook circuitry 70 is a state machine that functions as an error filter. Circuitry 70 monitors the data on ten buffer input data lines 34 and is responsive to the transmit byte clock signal TBYTECLK. In a preferred embodiment for use in FDDI networks, repeater node 10 receives from the upstream node a preamble including a number of idle line-state bytes, which occurs prior to transmission of the starting delimiter for the next frame of data. After one idle line-state byte is detected, circuitry 70 provides an input idle counter enable signal IICE. Circuitry 70 continues to provide the input idle counter enable signal until at least two consecutive bytes are detected that do not correspond to idle line-state bytes. Circuitry 70 thereby prevents a single byte error during transmission or detection of a string of idle line-state bytes from interfering with reset of the buffer.

Preferably, controller 18 includes an input idle counter 72. Counter 72 is enabled by the input idle counter enable signal IICE, and is reset when the enable signal from circuitry 70 is not provided. Counter 72 is a four-bit counter clocked by the transmit byte clock signal TBYTECLK that keeps track of the number of idle line-state bytes received by repeater node 10 from the upstream node. Counter 72 provides an input idle count flag sixteen signal IICF16 whenever sixteen consecutive idle line-state bytes have been provided on buffer input data lines 34 by framer 16. Sixteen idle line-state bytes have passed through framer 16 when counter 72 reaches a count of fifteen.

In a preferred embodiment of repeater node 10, elasticity buffer 12 is initialized (reset) whenever controller 18 detects one of two possible reset conditions: (1) receipt of sixteen consecutive idle line-state bytes from the upstream node; or (2) receipt of the first byte of data in a frame from the upstream node. As shown in FIG. 6, the JK detect signal (on two lines) from framer 16 and the IICF16 signal are provided to three AND gates 74. AND gates 74 in combination with an OR gate 76 indicate that controller 18 has detected the presence of a reset condition.

As shown in FIG. 6, an input wait timer 78 is preferably included in write controller 18. Input wait timer 78 is a 12-state counter which increments when clocked by the transmit byte clock signal TBYTECLK until it returns to its initial state. A timer signal is provided by timer 78 whenever it is in this initial state. Input wait timer 78 leaves the initial state when write controller 18 provides a pre-enable signal on line 69 in response to detection of either of the two reset conditions. Therefore, after the pre-enable signal and the enable signal are provided by write controller 18 in response to detection of a reset condition, timer 78 provides a waiting period of twelve byte times before it returns to the initial state. The timer signal is not provided during this waiting period to ensure that adequate time exists for completion of a previous initialization of elasticity buffer 12. The timer signal is provided to AND gates 74, which permits controller 18 to provide the pre-enable and enable signals if a reset condition is detected, unless initialization of buffer 12 commenced within the waiting period provided by timer 78.

In a preferred embodiment of write controller 18, three flip-flops 80A–80C are provided that are coupled to an OR gate 82, which provides the enable signal. These flip-flops are responsive to either the rising (TBYTECLK H) or falling (TBYTECLK L) edge of the transmit byte clock signal. This circuitry ensures that write controller 18 provides the enable signal for two full cycles of the transmit byte clock signal TBYTECLK. On the falling edge of transmit clock byte signal TBYTECLK immediately following the detection of a reset condition, the enable signal will be provided if input wait timer 78 is in its initial state. The enable signal is provided for two byte times, i.e., until the falling edge of the third transmit byte clock signal following detection of a reset conditions.

In a preferred embodiment of the invention, elasticity buffer 12 includes memory means for storing at least one initialization address. The memory means, in response to detection of the first multibit data unit of a frame, stores from the write pointer means as the initialization address for the read pointer means to the write address corresponding to the storage element selected to store the first multibit data unit.

As shown in FIG. 1, the memory means may be provided by temporary address memory 22. Temporary address memory 22 receives as inputs the pre-enable signal on line 69 from write controller 18, the input pointer count (IP) on lines 58 from write pointer 20, and the transmit byte clock signal TBYTECLK. Temporary address memory 22 preferably contains flip-flops for storing as the initialization address for read pointer 28 the input pointer count corresponding to the storage element which is selected to store the first byte (i.e., the starting delimiter) in a frame. The initialization address is provided on three lines by temporary address memory 22 to read pointer 28 and is designated as the address-in-memory (AIM) signal. On the rising edge of the transmit byte clock signal following providing of the pre-enable signal by write controller 18, the input pointer count is incremented by write pointer 20, and this write address is loaded into temporary address memory 22.

The preferred asynchronous elasticity buffer is synchronized only once during transmission of each frame of data. In synchronous elasticity buffers, each data unit written into the buffer is pre-synchronized, increasing the probability of errors due to metastability. In contrast, in the preferred embodiment of the invention, the read and write operations are asynchronous (write operations are in synchronism with the transmit clock byte signal and read operations are in synchronism with the local clock byte signal).

In a preferred embodiment of the invention, synchronizer 32 is provided to synchronize the writing and reading of the storage means once per frame of data. Preferably, synchronization, as well as initialization, occurs in response to receipt of the first byte in a new frame. However, other embodiments of an asynchronous elasticity buffer can be constructed with equivalent circuitry in which synchronization and/or initialization of the elasticity buffer occurs at another time among various times before, after, or during transmission of each frame.

Figure 7:
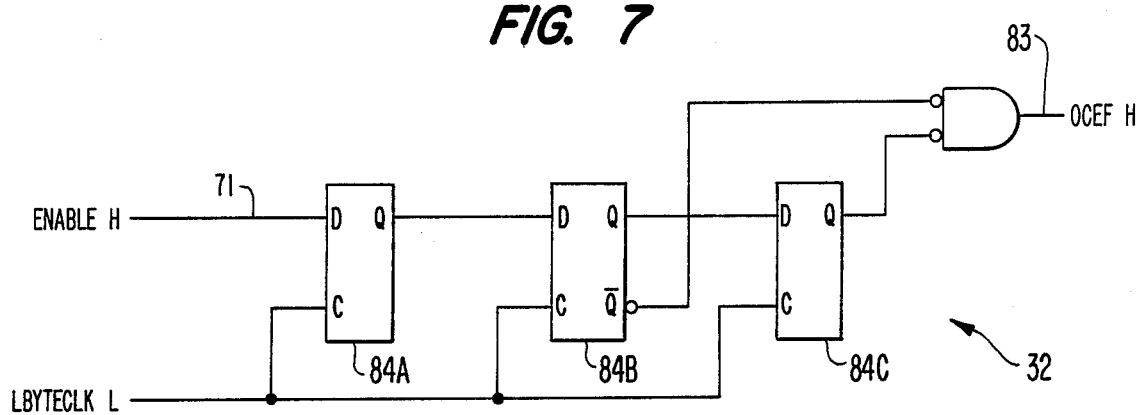
FIG. 7 is a schematic diagram of a synchronizer.

A preferred embodiment of synchronizer 32 is shown in FIG. 7. Synchronizer 32 receives the enable signal on line 71 from write controller 18 and provides an output controller enable flag signal OCEF to read controller 26 on line 83. The enable signal is provided by write controller 18 for two full cycles of transmit byte clock signal TBYTECLK, and is provided beginning on the falling edge of transmit byte clock signal TBYTECLK following detection of a reset condition. In synchronizer 32, the enable signal is sampled by a dual rank synchronizer including three flip-flops 84A-84C on the falling edge of the local byte clock signal. The output controller enable flag signal OCEF is provided if the enable signal is present when sampled by the falling edge of local byte clock signal LBYTECLK, except synchronizer 32 does not provide output controller enable flag signal OCEF to read controller 26 for more than two local byte clock signal periods.

As shown in the FIG. 1 embodiment, the elasticity buffer includes read (output) controller 26. Read controller 26 receives as inputs one byte of buffer output data on lines 44, local byte clock signal LBYTECLK, output controller enable flag signal OCEF from synchronizer 32, and an equal signal from read pointer 28. In response to these inputs, read controller 26 provides one byte of output data to read (output) buffer 30 on lines 55, and provides a read pointer load enable signal LOAD to read pointer 28 on line 85.

Figure 8:
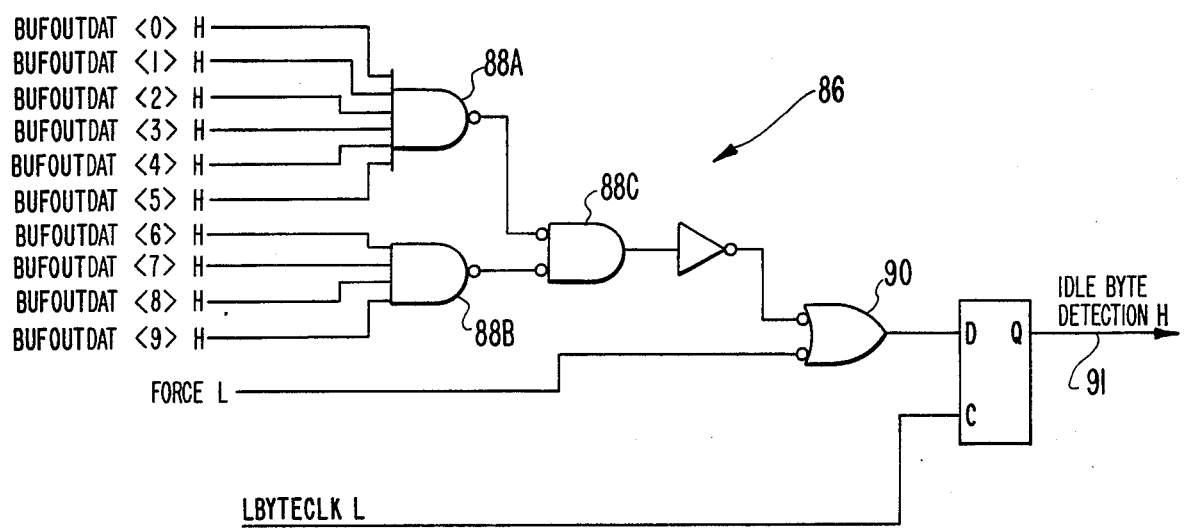
FIG. 8 is a schematic diagram of idle detection circuitry.

As embodied herein and shown in FIG. 8, read controller 26 includes idle detection circuitry 86. Circuitry 86 receives a byte of buffer output data from one storage element 24 via lines 44. For an FDDI network, the 5-bit code group corresponding to an idle symbol corresponds to 11111. Therefore, an idle byte is detected by inputting the buffer output data to AND gates 88A-88B. In a preferred embodiment, read controller 26 can force an idle byte to be substituted for the actual buffer output data on lines 44 by providing a force signal. The force signal is also monitored by idle detection circuitry 86. The force signal is input to an OR gate 90 along with the output from an AND gate 88C. OR gate 90 provides an idle byte detection signal on line 91 whenever an idle byte is being transmitted from read controller 26 to read buffer 30 and the downstream node.

Figure 9:
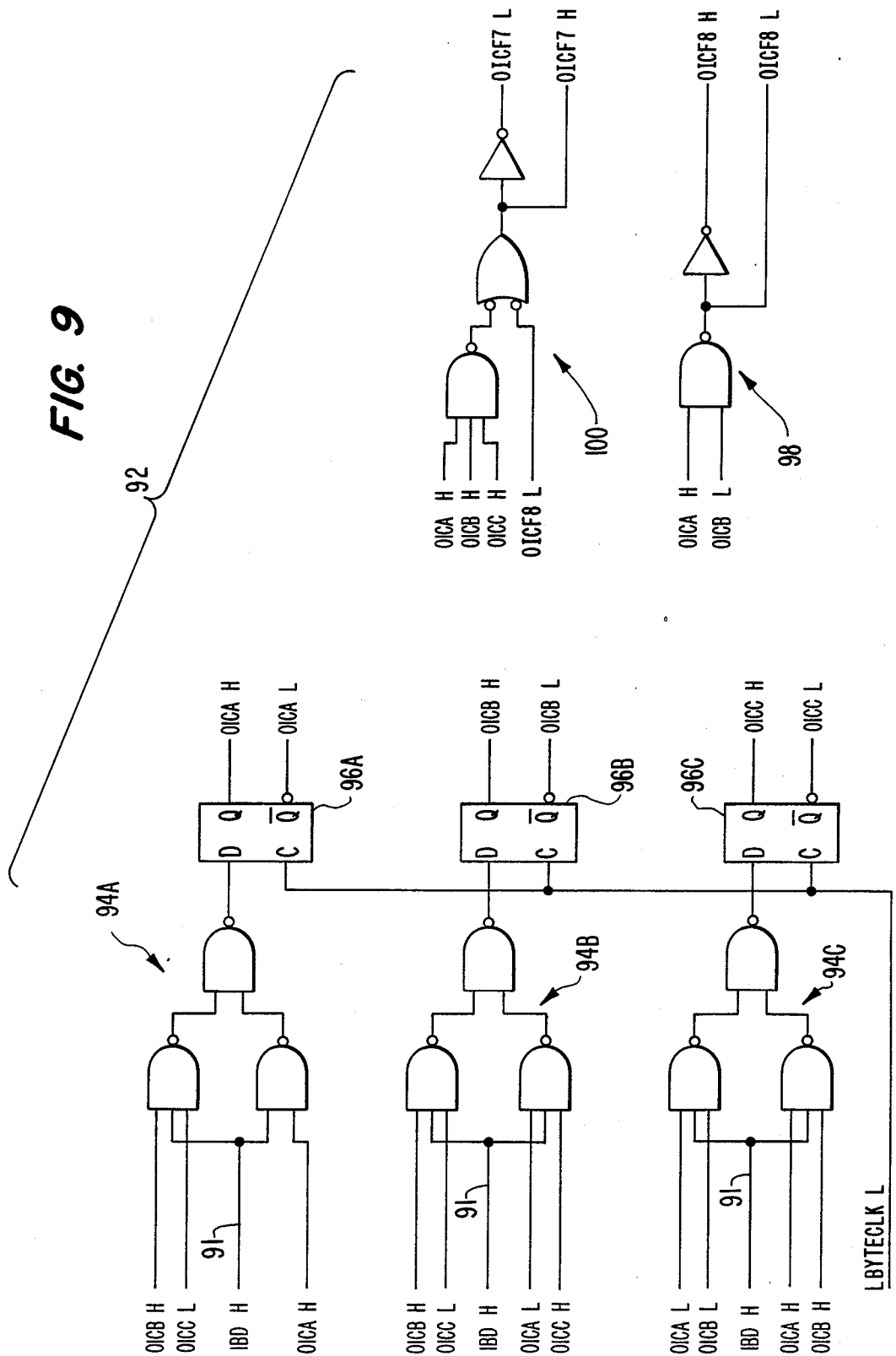
FIG. 9 is a schematic diagram of an output idle counter.

Preferably, read controller 26 includes an output idle counter 92, as shown in FIG. 9. Output idle counter 92 is an eight state counter which keeps track of the number of successive idle bytes provided to read buffer 30. Whenever idle detection circuitry 86 detects idle bytes on buffer output data lines 44 or the presence of the force signal, the idle byte detection signal on line 91 is input to AND gates 94A-94C. As long as idle bytes are being transmitted to the downstream node, AND gates 94A-94C provide outputs to three flip-flops 96A-96C that enable incrementing of counter 92 on the following falling edge of local byte clock signal LBYTECLK. When counter 92 reaches the final state, it remains in that state, indicating that at least eight idle bytes have been transmitted to the downstream node. Output idle counter 92 is reset only when idle detection circuitry 86 indicates that idle bytes are no longer being transmitted to the downstream node. Each flip-flop 96 provides one bit in the three-bit output idle count, which is referred to as output idle count signal OIC.

In the preferred embodiment, the output idle count signal is utilized by read controller 26 in determining the number of idle bytes that are being transmitted to the downstream node. As shown in FIG. 9, an output idle count flag eight signal OICF8 is provided by logic 98 in read controller 26 whenever the output idle count signal indicates that eight or more idle bytes are being transmitted to the downstream node. Similarly, logic 100 in read controller 26 asserts an output idle count flag seven signal OICF7 whenever counter 92 indicates seven or more idle bytes are being transmitted to the downstream node.

As embodied herein, the read controller performs a process that requires the storage means in elasticity buffer 12 to be progressively more full when initialization occurs before deleting idle bytes from the preamble preceding a subsequent frame. For a repeater node connected to an FDDI network, the minimum number of idle bytes between frames is six and the initial number of idle bytes provided between frames by a source node is eight.

In order to implement the preferred process, elasticity buffer 12 includes additional storage elements 24 so that read controller 26 can wait an additional time period before having to add or delete one or more idle bytes from the preamble. As embodied herein, implementation of the process requires the use of a total of eight storage elements 24, wherein four of these elements are additional storage elements provided to increase the range of buffer 12 by forty bits (four bytes).

In selecting a process for avoiding unnecessary shrinkage of the interframe gap, a trade-off is made between lowering the probability of deletion of idle bytes resulting in the preamble having fewer than a minimum number of idle bytes, and increasing the number of storage elements 24 and the amount of delay in transmission. In the preferred embodiment, a method and apparatus is provided that uses multiple thresholds in order to achieve the best results when these factors are considered.

Table I illustrates the use of multiple thresholds in an elasticity buffer. However, the buffer delays in Table I are for a buffer that does not include any circuitry for error detection. When additional hardware included in a preferred embodiment of the invention to detect impending error conditions is considered, the buffer delay increases by ten additional bits for reasons that will be explained later.

TABLE I

| Number of Idle Bytes | Elasticity Buffer Delay in Bits |
| --- | --- |
| greater than 8 | 5-15 |
| 8 | 5-25 |
| 7 | 15-45 |
| 6 | 35-55 |
| less than 6 | 45-55 |

The decision of whether to add or delete an idle byte from the preamble is a function of the number of idle bytes being transmitted to the downstream node as well as the fullness of the elasticity buffer. The fewer the number of idle bytes being transmitted, the closer to overflow elasticity buffer 12 must be before another idle byte will be deleted. Using this process, elasticity buffer 12 is four bytes larger than would otherwise be necessary, the maximum node delay is increased by 320 nanoseconds (four bytes), and the average node delay is increased by forty nanoseconds (five bits). If the process illustrated above is not utilized, the elasticity buffer delay will be at least 5-15 bits regardless of the number of idle bytes in the preamble being transmitted. In contrast, the illustrated process inreases the size of the initial delay as the gap between frames becomes smaller.

Figure 10:
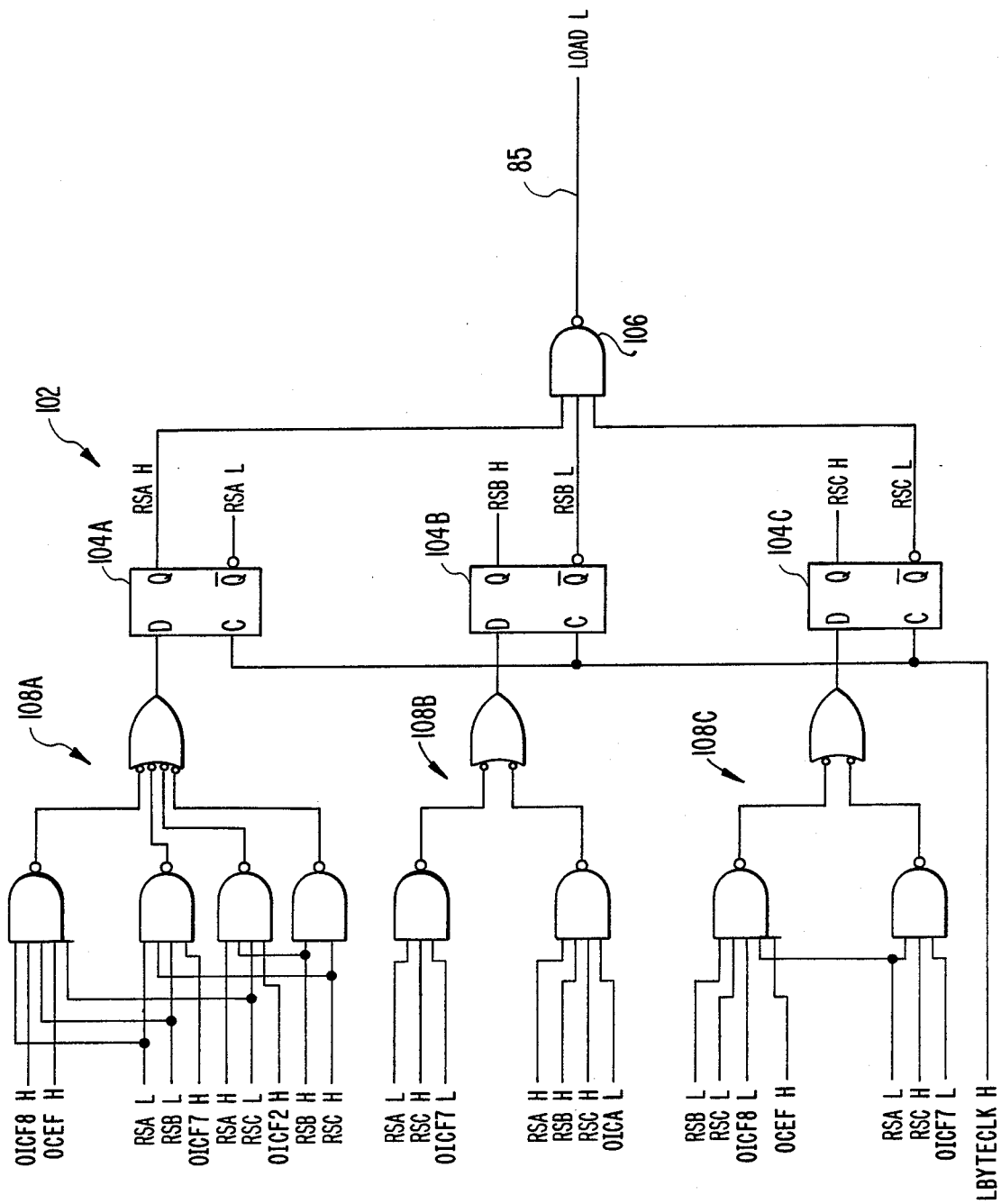
FIG. 10 is a schematic diagram of a reset state machine.

Preferably, read controller 26 includes a reset state machine 102, which is shown in FIG. 10. Additionally, the process implemented by reset state machine 102 is illustrated by a state diagram in FIG. 11.

In accordance with the invention, the write pointer means and/or the read pointer means may select an initialization address stored in the memory means in response to a control signal from the initialization means. Preferably, reset state machine 102 is a six-state sequential machine which utilizes the number of idle bytes counted by output idle counter 92 to determine when to provide a read pointer load enable (load) signal on line 85, which corresponds to the control signal. The read pointer load enable signal provided by reset state machine 102 to read pointer 28 causes the read pointer to be loaded with the stored initialization address (AIM) provided by temporary address memory 22, as shown in FIG. 5. Initialization (resetting) of read pointer 28 causes selection of the storage element containing the starting delimiter for the subsequent frame. In response to initialization, the write address selected by write pointer 20 is selected as a read address by read pointer 28 after a predetermined delay. Providing of the load signal by reset state machine 102 thereby enables transmission of the starting delimiter to the downstream node.

As shown in FIG. 10, reset state machine 102 includes three flip-flops 104A–104C that provide the three-bit reset state signal RS that indicates the current state. The reset state signal RS is provided to an AND gate 106 which asserts the read pointer load enable signal when reset state machine 102 is in state 100. The inputs to flip-flops 104 are provided by logic 108, which is responsive to the output controller enable flag signal provided from synchronizer 32 on line 83, and to output idle count and output idle count flag signals provided by output idle counter 92.

Figure 11:
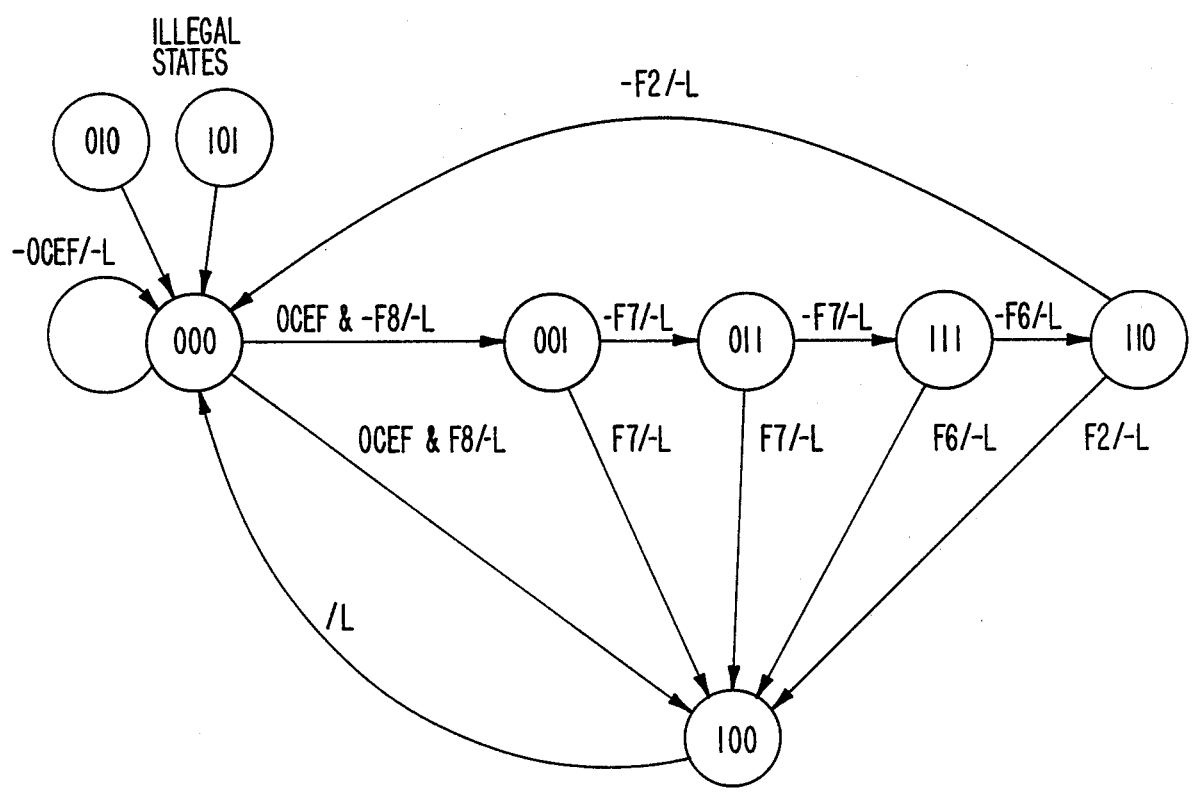
FIG. 11 is a state diagram for a reset state machine.

As shown in FIG. 11, reset state machine 102 usually loops in idle state 000 until the output controller enable flag signal OCEF is provided. In response to the providing of OCEF, the output idle count signal OIC is sampled on the next rising edge of the local byte clock signal.

When the OCEF signal is provided and the output idle count flag eight signal OICF8 has been set, state machine 102 proceeds to state 100. The OICF8 signal indicates that eight or more idle bytes are being transmitted to a downstream node. (Although only seven or more idle bytes have actually been detected at this time, an additional idle byte will be transmitted before reset state machine 102 can return to idle state 000.) During the reset state 100, the load signal is output to read pointer 28 on line 85. Read pointer 28 is driven by the falling edge of local byte clock signal LBYTECLK and will therefore select the address of the storage element containing the starting delimiter for the subsequent frame on the falling edge of the local byte clock signal following entry of reset state machine 102 into reset state 100. The count of eight idle bytes is more than a high threshold number of idle bytes, which is preferably set to equal seven bytes. Therefore, as shown in Table I, the delay immediately after initialization in selecting the write address as the read address is always at least five bit times, but transmission of the starting delimiter for the subsequent frame may be further delayed by read controller 26.

When eight or more idle bytes are not being transmitted to the downstream node, reset state machine 102 proceeds from state 000 to state 001 in response to the OCEF signal indicating receipt of the starting delimiter for the subsequent frame. Reset state machine 102 remains in state 001 for one byte time and monitors whether the output idle count flag seven signal OICF7 is provided indicating that seven idle bytes are being transmitted to the downstream node.

If seven idle bytes are being transmitted to the downstream node, state machine 102 proceeds from state 001 to reset state 100, and then performs in the manner previously described. When the high threshold number of seven idle bytes is being transmitted to the downstream node, the load signal is not provided by read controller 26, thereby delaying transmission of the starting delimiter to the downstream node even though the write address has been selected as the read address. Since reset state machine 102 has to proceed to state 001 before it enters the reset state 100, transmission of the starting delimiter is delayed for one additional byte time compared with a situation in which eight or more idle bytes are being transmitted. Thus, as shown in Table I, the minimum elasticity buffer delay is 15 bit times when seven idle bytes are being transmitted.

If fewer than seven idle bytes are counted by output idle counter 92, reset state machine 102 proceeds from state 001 to state 011, where it remains for one byte time. If fewer than seven idle bytes are counted by output idle counter 92, reset state machine 102 then proceeds to state 111, where it remains for an additional byte time. When the output idle count signal indicates that six idle bytes, which preferably corresponds to a low threshold number, are being transmitted to the downstream node, then reset state machine 102 can proceed from state 111 to reset state 100. Thus, in response to an idle byte count indicating that a low threshold number of six idle bytes is being transmitted to the downstream node, reset state machine 102 does not provide the load signal, thereby delaying transmission of the starting delimiter to the downstream node for an even longer time period. Reset state machine 102 is required to enter two additional states before it enters reset state 100 and asserts the control signal. This corresponds to the process shown in Table I, in which an idle byte count of six results in a minimum delay that is two byte times longer than the minimum delay when seven idle bytes are being transmitted to the downstream node.

At times when output idle counter 92 indicates that fewer than six idle bytes are being transmitted to the downstream node, state machine 102 proceeds from state 111 to state 110, where it remains for one byte time. As long as two or more idle bytes are being transmitted to the downstream node, or if the read address (OP) equals the stored initialization address (AIM), reset state machine 102 will then proceed to reset state 100. In this situation, reset state machine 102 enters four additional states before proceeding from idle state 000 to reset state 100. Thus, when a lower threshold number of idle bytes equal to five or less is being transmitted to the downstream node, transmission of the starting delimiter is delayed for an additional byte time. As shown in Table I, the minimum elasticity buffer delay is 45 bits whenever fewer than six idle bytes are being transmitted to the downstream node.

In unusual situations, reset state machine 102 may leave state 110 and proceed to initial state 000 without detection of a single idle byte. This may occur if the write and read pointers have drifted far from their initial spacing. In this situation, data may be deleted by repeater node 10 if reset state machine 102 enters the reset state 100. Therefore, if one idle byte has not been detected, and if the read address (OP) does not equal the stored initialization address, state machine 102 proceeds directly from state 110 to the initial state 000, and no initialization (reset) of elasticity buffer 12 occurs.

As embodied herein, read pointer 28 provides an equal signal to read controller 26 to indicate that elasticity buffer 12 is ready to begin transmitting the first byte of the subsequent frame to the downstream node. The equal signal is provided by read pointer 28 when the output pointer count (OP) matches the stored initialization address (AIM). This occurs only when the storage element 24 selected by read pointer 28 to provide buffer output data to buffer 30 (via read controller 26) contains the first byte (the starting delimiter) in the subsequent frame.

Preferably, read controller 26 includes a force idle state machine 110, as shown in FIG. 1. State machine 110 functions to cause additional idle bytes to be transmitted to the downstream node whenever the load signal is not being provided, even though the equal signal provided by read pointer 28 indicates that buffer 12 is otherwise ready to begin transmitting the first byte (the starting delimiter) of the subsequent frame. Force idle state machine 110 works in conjunction with reset state machine 102 in order to add idle bytes to the preamble between frames whenever transmission of the first byte in a subsequent frame is delayed because the output idle count signal from output idle counter 92 indicates the number of idle bytes being transmitted to a downstream node is at or below a certain threshold.

In the preferred embodiment of the invention, the elasticity buffer is initialized by providing a loadable read pointer 28 and free-running write pointer 20, and loading a write address selected by write pointer 20 into read pointer 28 as a read address after a predetermined delay. However, an elasticity buffer in accordance with the present invention can be provided using other equivalent circuits. For example, the write pointer means may correspond to a loadable counter, while the read pointer means corresponds to a free-running counter. In such an embodiment, initialization can be performed by loading the write pointer means with an initial write address that will be selected by the free-running read pointer means after a predetermined delay. In another embodiment, both the read pointer means and the write pointer means may be loadable. In this embodiment, initialization may be performed by loading different addresses into the read pointer means and the write pointer means. The initial read address for the read pointer means is selected so that a predetermined delay will occur before the read pointer means selects as the read address the initial write address which was loaded into the write pointer means. Other possible embodiments of the invention may include one or more state machines for selecting the read and/or write addresses such that a predetermined delay elapses before a particular write address is selected as a read address.

In accordance with the invention, the elasticity buffer includes detection means for detecting whether an error condition corresponding to a write overflow or read underrun of a storage element is impending by determining whether the same address is selected as the write address and the read address during an overlap time period having a duration equal to a threshold time period. As embodied herein and shown in FIG. 12, the detection means may be provided by overflow/underrun detection circuitry 112.

Immediate and reliable detection of an overflow and/or under-run condition is extremely difficult to perform if data is asynchronously entering and leaving an elasticity buffer. However, by monitoring the read and write addresses for the elasticity buffer, it is possible to detect when an overflow/under-run condition is impending. For example, if each storage element in the elasticity buffer contains ten bits (one byte in the FDDI protocol), then the elasticity buffer is on the verge of overflow or underrun of a storage element when both the read pointer and write pointer select the same address for ten bit times (relative to either the local or transmit byte clock signal).

An overflow or underrun of a storage element occurs when that storage element is being written to and read from at the same time. Furthermore, because of the finite propagation delays and set-up and hold times associated with the logic in an elasticity buffer, it is impossible for data to remain uncorrupted if a single storage element is being written to and read from at precisely the same time. Therefore, data corruption occurs before actual overflow or underrun of a storage element if data is read from that storage element too soon after being written. Thus, it is important for a detection means to indicate that an overflow or an underrun condition is impending before an overflow/underrun occurs, thereby preventing corrupted data from being transmitted through the elasticity buffer without being flagged.

As an example, the time when the detection means must detect that a write overflow or read underrun of a storage element is impending can be calculated. It is assumed that a parallel asynchronous elasticity buffer is provided in which each storage element contains ten bits (one byte) of data, and in which valid data is obtained only if data is read from a storage element at least four bit times after it is written. In this example, in order to guarantee that no corrupted data will pass through the elasticity buffer without being flagged, the detection means must detect that a write overflow or read underrun is impending whenever the read pointer and write pointer select the same address for an overlap time period of six bit times or less.

Asynchronous operation of the read and write pointers makes determination of the exact amount of any overlap in the two pointers a non-trivial task. However, it is not as difficult to determine when the two pointers overlap (i.e., select the same address as the write address and the read address) during an overlap time period falling within a given range. Furthermore, if the independent clocks in the upstream node and the repeater node can be assumed not to differ in frequency by a large amount (i.e., 50% for the following examples), then only one independent clock need be used in sampling the read and right pointers to determine the amount of pointer overlap. If this assumption is not valid, the same basic detection approach can be used, although the detection means becomes more complicated because both the transmit byte clock signal and the local byte clock signal must be sampled in order to determine the amount of pointer overlap.

The use of asynchronous read and write pointers in the elasticity buffer makes it necessary to utilize gray code counters for the pointers. Pointer overlap is detected by sampling of the output and input pointer counts. However, if one of the two pointers increments its count immediately before sampling, an uncertainty exists concerning the state of any bits that were changed. For example, if a count changes from 111 to 000, there is a possibility of glitching of the output because it is possible to interpret the count as having any of eight possible values. However, gray code counters provide counts that change only one bit at a time and which can only be interpreted as one of two consecutive counts, thereby preventing gliching of the output and reducing the probability of false error detection.

Figure 12:
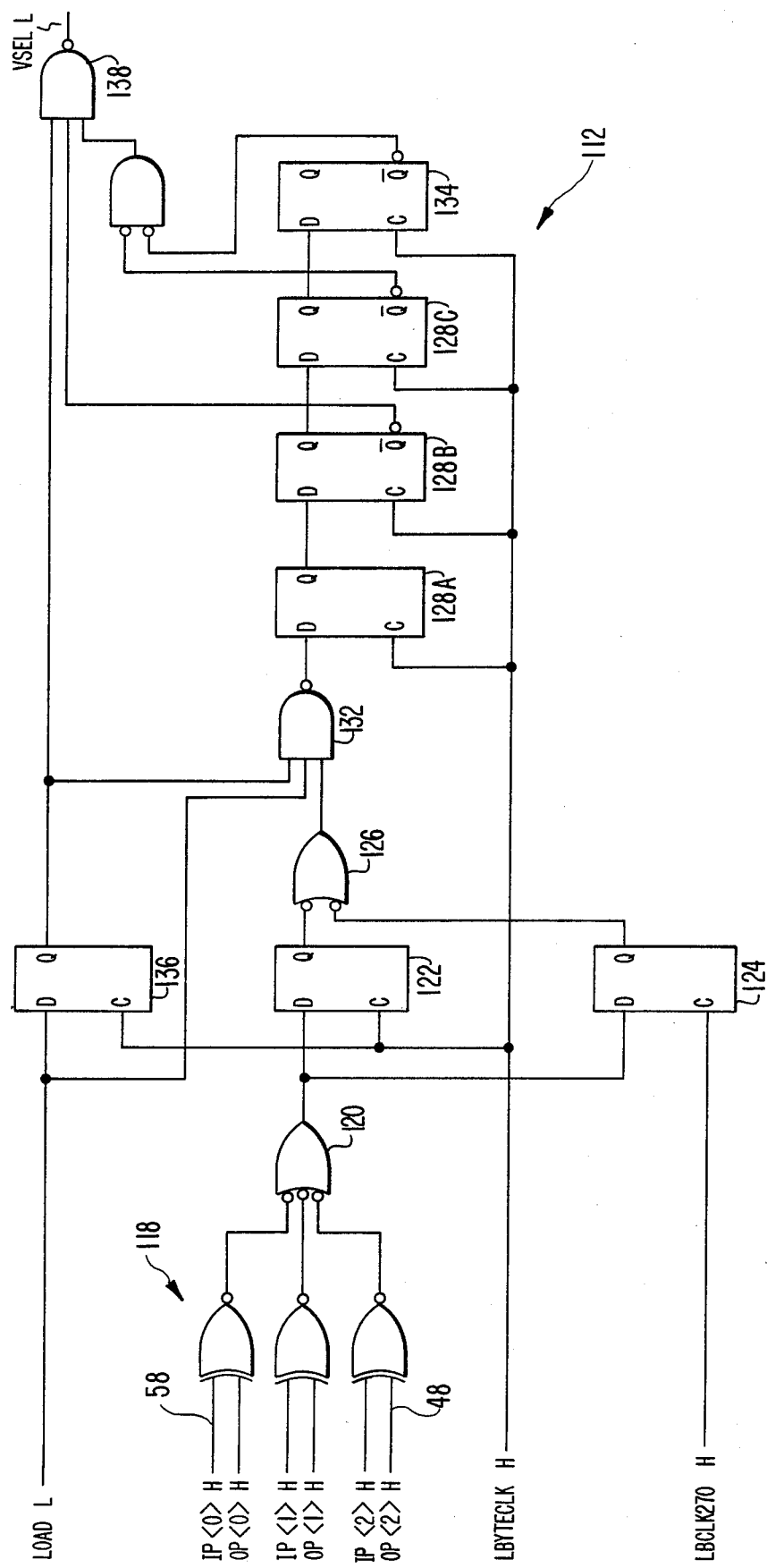
FIG. 12 is a schematic diagram of overflow/underrun detection circuitry.

In a preferred embodiment of the invention, the elasticity buffer includes means for providing one or more sampling clock signals. In this preferred embodiment, the detection means also includes comparator means for comparing, in response to the sampling clock signal, the write address and the read address. Preferably, the sampling clock signal or signals are in synchronism (i.e., maintain a fixed phase relationship) with the local byte clock signal, as opposed to the transmit byte clock signal. As embodied herein, and as shown in FIG. 12, overflow/underrun detection circuitry 112 uses a first sampling clock signal provided by the sampling clock signal providing means to detect whether a write overflow is impending, and uses a second sampling clock signal out of phase with the first sampling clock signal to detect whether a read underrun is impending. Preferably, the first sampling clock signal is approximately 270° out of phase with the local byte clock signal, and the second sampling clock signal is approximately 180° out of phase with the local byte clock signal.

Figure 13:
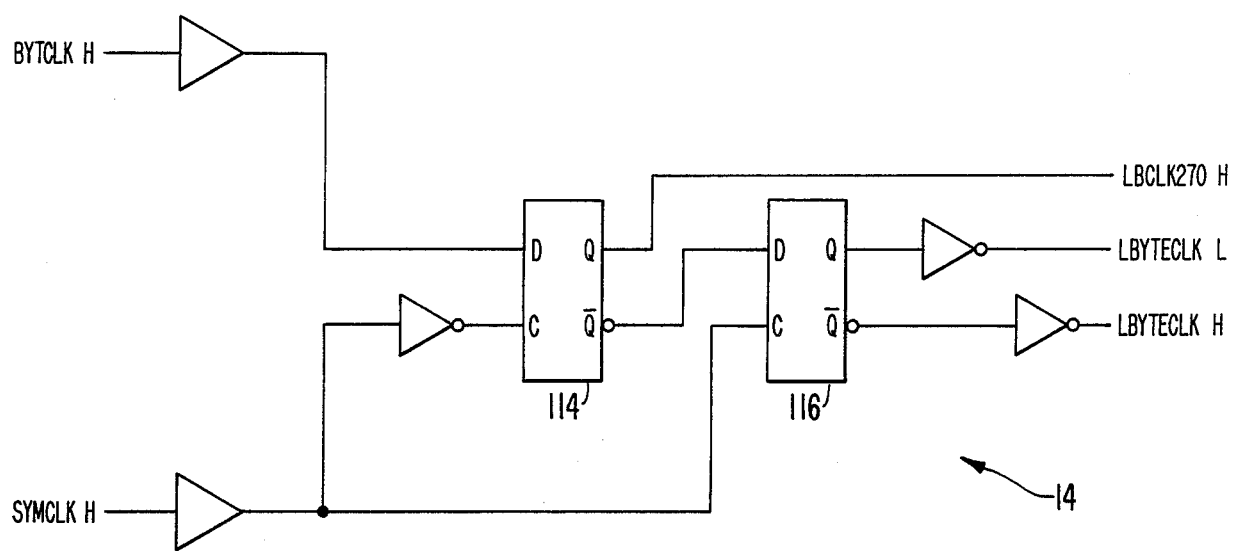
FIG. 13 is a schematic diagram of clock generator circuitry.

A preferred embodiment of a sampling clock signal providing means for providing a first sampling clock signal to detect whether a write overflow is impending and a second sampling clock signal out of phase with the first sampling clock signal to detect whether a read underrun is impending is shown in FIG. 13. In this embodiment, clock generator circuitry 14 receives as inputs from a local oscillator the byte clock signal and a symbol clock signal.

Clock generator circuitry 14 generates a local byte clock signal LBYTECLK L, which will be referred to as the phase zero local byte clock signal, and also generates a phase 180 local byte clock signal LBYTECLK H and a phase 270 local byte clock signal LBCLK270 H. Each of these outputs represents a different phase of the independent clock in the repeater node. The symbol clock signal from the local oscillator is required because a signal running at twice the frequency of the byte clock is needed to easily obtain four different phases of the local byte clock signal. If only two phases of the local byte clock signal were required, i.e., the phase zero byte clock signal and phase 180 local byte clock signal, then the necessary sampling clock signals can be easily provided using only an inverter. As embodied in FIG. 13, the clock generator circuitry includes a flip-flop 114 that provides the phase 270 local byte clock signal, and a flip-flop 116 that provides both the phase zero local byte clock signal and the phase 180 local byte clock signal.

A first case of interest occurs when the local byte clock signal is faster than the transmit byte clock signal. In this case, the read address selected by the read pointer means catches up with the write address selected by the write pointer means. If the read and write pointers are compared, and there is an overlap detected using a comparator means that samples with the phase 180 local byte clock signal, there is an overlap time period having a duration equal to five bit times minus the propagation delay through any comparator logic and the set-up times of any flip-flops in the read and write pointers. Depending on the circuit design and device technology used, these propagation delays and set-up times may have a duration of less than a single bit time. Therefore, under these circumstances, a detection means using the phase 180 local byte clock signal can determine that the same address is selected as the write address and the read address during an overlap time period having a duration of between four and five bit times. If the propagation delays and set-up times are as high as three bit times, then the overlap time period that can be determined has a duration of between two and five bit times.

A second case of interest occurs when the transmit byte clock signal is faster than the local byte clock signal. In this case, the write address selected by the write pointer means catches up to the read address selected by the read pointer means. If the detection means includes comparator means that samples the write address and the read address using the phase 270 local byte clock signal, the detection means can determine whether the same address is selected during an overlap time period having a duration equal to 2½ but times, plus the propagation delay through any comparator logic and the set-up times of any flip-flops in the read and write pointers that are sampled. The overlap time period that can be determined by the detection means using the phase 270 local byte clock signal is between 2½ and 3½ bit times if the propagation delays and the set-up times have a duration of less than one bit time. If the propagation delays and set-up times have a duration as high as three bit times, then the detection means is able to determine whether the same address is selected as the write address and as the read address during an overlap time period having a duration of between 2½ and 5½ bit times. The pointers can also be compared in this second case using the phase 180 local byte clock signal. If the propagation delays and set-up times have a duration of less than one bit time in these circumstances, then the detection means can determine whether the same address is selected during an overlap time period having a duration of between five and six bit times.

These examples illustrate that when the propagation delays and the set-up times do not have a duration exceeding a single bit time, detection of overflows and underruns can be simplified using only the phase 180 local byte clock signal for both conditions to determine whether the same address is selected during an overlap time period having a duration in the range between four and six bit times. If propagation delays and set-up times are assumed to have a duration not exceeding three bit times, the phase 180 local byte clock signal provides a second sampling clock signal for a comparator means that detects an overlap time period of between two and five bit times for an impending underrun, and the phase 270 local byte clock signal detects an overlap time period having a duration of between 2½ to 5½ bit times for an impending overflow.

In the examples described above, apparatus has been described that detects an impending overflow or underrun when the overlap time period has a duration of less than six bit times. For relatively large propagation delays and set-up times, a detection range of between two and 5½ bit times is obtained using two different phases of a four-phase clock.

In situations in which the comparison logic is relatively fast (i.e., propagation delays and set-up times having a duration not exceeding one bit time), the comparator means can detect both impending overflows and underruns using a phase 180 local byte clock signal. The phase 180 local byte clock signal is simply the inverted local byte clock signal, thereby eliminating the additional circuitry required to generate a multiphase clock signal.

The detection means of the present invention may be provided using sampling clock signals other than those described herein. Multiphase or higher speed clock signals may be necessary, depending on the speed of the design, the duration of the overlap time period that must be detected by the detection means, and the size of the detection range corresponding to the threshold time period that is acceptable.

The inclusion of detection means in the parallel asynchronous elasticity buffer requires an increase in the amount of storage that must be provided by the storage elements. The minimum number of additional bits of storage for purposes of detecting whether a write overflow or read underrun of a storage element is impending is referred to as the overflow/underrun detection overhead. The overflow/underrun detection overhead is equal to the size of a single storage element (one byte or ten bits) minus the smallest amount of pointer overlap that can be determined by the detection means. When propagation delays and set-up times have a duration of three bit times or less, and the phase 180 byte clock signal and phase 270 byte clock signal are used to detect an error condition, then the minimum amount of pointer overlap that can be determined equals two bits for underruns and 2½ bits for overflows. Therefore, if the local byte clock signal is faster than the transmit byte clock signal, this results in underrun detection overhead of eight bits. Similarly, if the transmit byte clock signal is faster than the local byte clock signal, the overflow detection overhead equals 7½ bits.

In accordance with the FDDI protocol, a slippage in clock frequency of at most 4½ bit times during transmission of a maximum length frame of data can be expected in a system in which the clocks are operating within prescribed tolerances. The initial spacing in selection of addresses provides a predetermined delay of at least fifteen bit times for buffer 12. In order for the read pointer and write pointer to select the same address for ten bit times (i.e., one byte time), the amount of clock slippage during transmission of a frame must equal fifteen bit times. After initialization, the read pointer and write pointer will not select the same address and will not overlap at all until a slippage of at least five bit times has occurred between the transmit byte clock signal and the local byte clock signal. In the preferred embodiment of overflow/underrun detection circuitry 112 shown in FIG. 12, an impending write overflow and/or read underrun is detected before actual overflow/underrun occurs when the independent clocks in the upstream node and the repeater node have slipped at least eight bit times with respect to each other, corresponding to an overlap for more than two bit times.

Overflow/underrun detection circuitry 112 is designed to detect an overlap time period having a duration equal to a threshold time period ranging between two (or 2½) and five (or 5½) bit times. In a preferred embodiment, initialization causes the read pointer to lag the write pointer by between fifteen and twenty-five bit times, and the amount of lag can be increased to between fifty-five and sixty-five bit times if idle bytes are added by read controller 26 to the preamble between frames. Therefore, overflow/underrun detection circuitry 112 detects an error condition when clock frequencies or frame length significantly exceed specification but before the actual occurence of a write overflow or read underrun condition, thereby preventing any data corruption from occurring.

As shown in FIG. 12, the comparator means may include three XOR gates 118 and an OR gate 120. Each of three encoded read address selection lines 48 and three encoded write address selection lines 58 is input to one corresponding XOR gate 118. If the same address is being selected as the write address and as the read address, the read pointer count (OP) and write pointer count (IP) will be identical. If the read and write addresses are identical, a signal is provided by OR gate 120 to a flip-flop 122, which detects whether a read underrun is impending, and to a flip-flop 124, which detects whether a write overflow is impending. Flip-flop 122 is clocked by the phase 180 local byte clock signal, and flip-flop 124 is clocked by the phase 270 local byte clock signal.

As shown in FIG. 12, when the comparator means determines that the same address is selected as the write address and the read address during an overlap time period, a signal is provided to OR gate 126. This signal is provided only if the overlap time period has a duration exceeding two bit times. The output from OR gate 126 is dual rank synchronized using the phase 180 local byte clock signal and flip-flops 128A-128C. A VSEL signal is provided by overflow/underrun detection circuitry 112 in synchronizer 32 to read buffer 30, where it is retimed to the byte clock signal from the local oscillator in the repeater node and output as an elasticity buffer error signal EBFERR. The VSEL signal is also provided by synchronizer 32 to read pointer 28, as shown in FIG. 5.

In read pointer 28 (FIG. 5), three multiplexers 130A-130C are provided that are responsive to the load signal and can change the inputs loaded into flip-flops 66. As shown in FIG. 5, when the load signal is not provided, multiplexers 130A-130C feed back two inverted bits of the output pointer count through counter logic 68 into two corresponding flip-flops 66, and feed back the third bit in the output pointer count unchanged to the remaining flip-flop 66 through counter logic 68. As a result, the output pointer count (OP) is reset to a new read address located four buffer locations away, preventing write overflow or read underrun of a storage element from actually occurring.

In the preferred embodiment of overflow/underrun detection circuitry 112, when read controller 26 provides the load signal at exactly the same time that VSEL is asserted, it is preferable to initialize elasticity buffer 12 in the normal manner, and the VSEL signal is ignored. Initialization of the elasticity buffer when the first byte in a new frame is received prevents write overflow or read underrun of a storage element. There is no need to provide an elasticity buffer error signal in this situation because detection circuitry 112 is designed so that detection of an impending overflow or underrun occurs before any data is actually corrupted.

Figure 14:
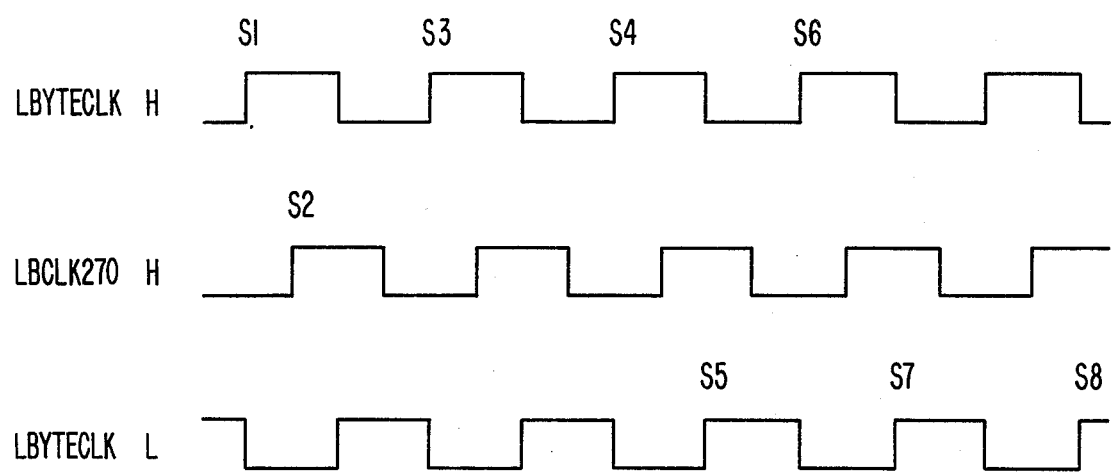
FIG. 14 is an error detection timing chart.

The timing for overflow/underrun detection is illustrated in FIG. 14. Flip-flops 122 and 124 (FIG. 12) sample the output of OR gate 120 on each rising edge of the phase 180 local byte clock signal and the phase 270 local byte clock signal, respectively. If a signal is provided by OR gate 126 when it is sampled on either rising clock edge, an error signal is provided by OR gate 126. An impending read underrun condition is detected at clock edge S1 and an impending write overflow condition is detected at clock edge S2. If read controller 26 is providing the load signal on clock edge S1, write overflow/read underrun detection is immediately negated by AND gate 132 shown in FIG. 12. If read controller 26 has not yet provided the load signal, however, an error signal is provided by AND gate 132 to a dual rank synchronizer including flip-flops 128. The error signal is clocked through the dual-rank synchronizer on clock edges S3 and S4. An error signal is provided by flip-flops 128 in the dual-rank synchronizer to flip-flop 134, which delays the error signal for one additional byte time. The output of flip-flop 134, the output of the synchronizer, and a load signal from read controller 26 that has been delayed for one byte time by flip-flop 136 are all input to AND gate 138. The delayed load signal is used to negate an error signal indicating detection of an impending overflow and/or underrun. If read controller 26 provides a load signal on clock edge S3, the delayed load signal is provided on S4, the same time that an error signal is provided by flip-flops 128 in the synchronizer. Under these circumstances, AND gate 138 will prevent the VSEL signal from being provided. Thus, if the load signal is provided by read controller 26 on clock edge S1 or S3, the VSEL signal will not be provided. If read controller 26 does not provide the load signal at either of these times, the VSEL signal will be provided by AND gate 138 to read buffer 30 on clock edge S5.

On clock edge S6, the VSEL signal is no longer provided by AND gate 138. An elasticity buffer error signal is provided by read buffer 30 on the rising edge of the byte clock signal provided by the local oscillator, which occurs sometime between S6 and S7. The elasticity buffer error signal will stop being provided sometime between S7 and S8.

In the preferred embodiment, the providing of the VSEL signal results in the read pointer being loaded with a read address that is four bytes away from its current position because that address is approximately one half the length of the buffer away. This reset of the read pointer prevents a metastable condition from occurring due to excessive overlap of the two pointers, but will also cause some data to be reread or lost. However, the providing of an elasticity buffer error signal by read buffer 30 prevents any data corruption from occurring that is unexpected or undetected. In read pointer 28, an OR gate 140 (FIG. 5) is provided for monitoring the VSEL signal and the load signal so that a new read address is loaded into flip-flops 66 when either initialization or error detection occurs. On clock edge S5, a new read address is provided by pointer 28, thereby eliminating the overlap in selection of the write address and the read address. The read address is moved four bytes away from the previous read address if the VSEL signal is provided by using one bit in the present output pointer count (OP) and inverting the other two bits in the three-bit count.

Whenever the elasticity buffer is initialized, data in storage elements 24 may be discarded. However, data corruption is prevented by providing interframe gaps consisting of idle line-state bytes between successive frames of data. By initializing the elasticity buffer only during long interframe gaps or at the beginning of a new frame of data, corruption of actual data will not occur since the interframe gaps can be corrupted without concern. The process shown in Table I by which idle line-state bytes may be added to an interframe gap ensures that an adequate interframe gap will exist. This allows any nodes in the network to initialize without corrupting data when the first byte in a new frame is received.

In the preferred embodiment of the elasticity buffer, eight one-byte storage elements are provided. The size of the buffer is calculated by considering several of factors.

Elasticity buffers work on the principle that by writing data into a buffer until it is partially full before any data is read out of the buffer, the buffer is able to accommodate for differences in the speeds at which read and write operations occur. Larger buffers can accommodate for greater speed differences between clocks used for reading and writing. The minimum size of the buffer is determined based on several parameters: (1) the nominal frequency of transmission of the data units (Fn); (2) the data format (serial or n bits in parallel); (3) the clock tolerance about the nominal frequency (plus/minus Fd); and (4) the maximum number of data units in a frame or packet (L). The maximum allowable clock frequency $Fh=Fn+Fd$, and the minimum allowable clock frequency $Fl=Fn-Fd$. Clock slip is defined as the difference in the number of clock cycles between two clocks over some period of time. The maximum amount of clock slip (S) between the clocks used in reading and writing the buffer during transmission of a maximum length frame of data is calculated (in seconds) to be $S=L\times(1/Fl-1/Fh)$. If Pb is the nominal period of a bit time in seconds, then the maximum allowable slip in bit times (Sb) is defined as $Sb=S/Pb$. Therefore, over the course of a maximum length frame, two clocks controlling read and write operations of the buffer may slip relative to each other by as many as Sb bit times.

Therefore, the buffer must have a size at least $2\times Sb$ bits long in order to accommodate the frequency differences that may exist between two clocks within the allowed tolerances. At least Sb bits of buffering in one direction is needed when the the read clock is faster than the write clock, and at least Sb bits of buffering in the other direction is needed when the write clock is faster than the read clock.

The size of the buffer is increased to account for the overhead involved in writing to and reading from a buffer. The amount of overhead depends on how overflow/underrun conditions are detected, on how synchronization between writing and reading of data is accomplished, and on the amount of data that is written into any one storage element at a time. For example, a serial elasticity buffer (in which one bit is written and read at a time) does not have to be as large as a parallel elasticity buffer.

In determining the size of the elasticity buffer for a preferred embodiment of the invention, the maximum allowable clock slip Sb was assumed to equal five bits in view of the FDDI protocol. Furthermore, overflow-/underrun detection in the embodiment described herein occurs by determining whether there is a pointer overlap of at least two or 2½ bits. Additionally, a parallel elasticity buffer is provided, in which each storage element contains one byte, and writing and reading is performed asynchronously in units of one byte.

As discussed previously, the overflow/underrun detection overhead for a preferred embodiment of the invention is approximately 7½ bits for overflow detection and approximately eight bits for underrun detection. When the maximum allowable clock slip of five bits is accounted for, an effective pre-buffer contains thirteen bits, and an effective post-buffer contains 12½ bits. Thus, when the elasticity buffer is initialized (preferably at the beginning of a frame), a write address should not be selected as a read address by a read pointer means for at least thirteen bit times. Similarly, the read pointer means should lead the write pointer means by at least 12½ bit times because the read and write pointers are circular, i.e., a pointer selects the first buffer location after selecting the last buffer location. Thus, the minimum elasticity buffer size equals 25½ bits (12.5+13). However, data is written and read one byte at a time in the parallel elasticity buffer. There cannot be any buffer locations containing only partial bytes. As a result, the minimum practical elasticity buffer contains thirty bits, resulting in an effective pre-buffer and post-buffer of fifteen bits each.

An additional factor increasing the size of a practical buffer is a result of the asynchronous read and write operations. A specific separation between the read and write pointers cannot be guaranteed because of the asychronous transmit and local byte clock signals. The buffer can only determine whether the separation between the two pointers falls within a specific range. The range of uncertainly in pointer separation is one byte (ten bits). Therefore, the size of an effective buffer must be increased by an additional byte (ten bits) due to the uncertainty resulting from synchronization of two asynchronous byte clock signals.

In one practical embodiment of the invention of minimum size, the storage elements in elasticity buffer 12 must provide a total of forty bits (four bytes) of storage. In the preferred embodiment of the invention described herein, however, four additional bytes of storage have been provided in order to allow the elasticity buffer to implement an algorithm that will ensure that an interframe gap between consecutive frames of data is maintained.

Figure 15:
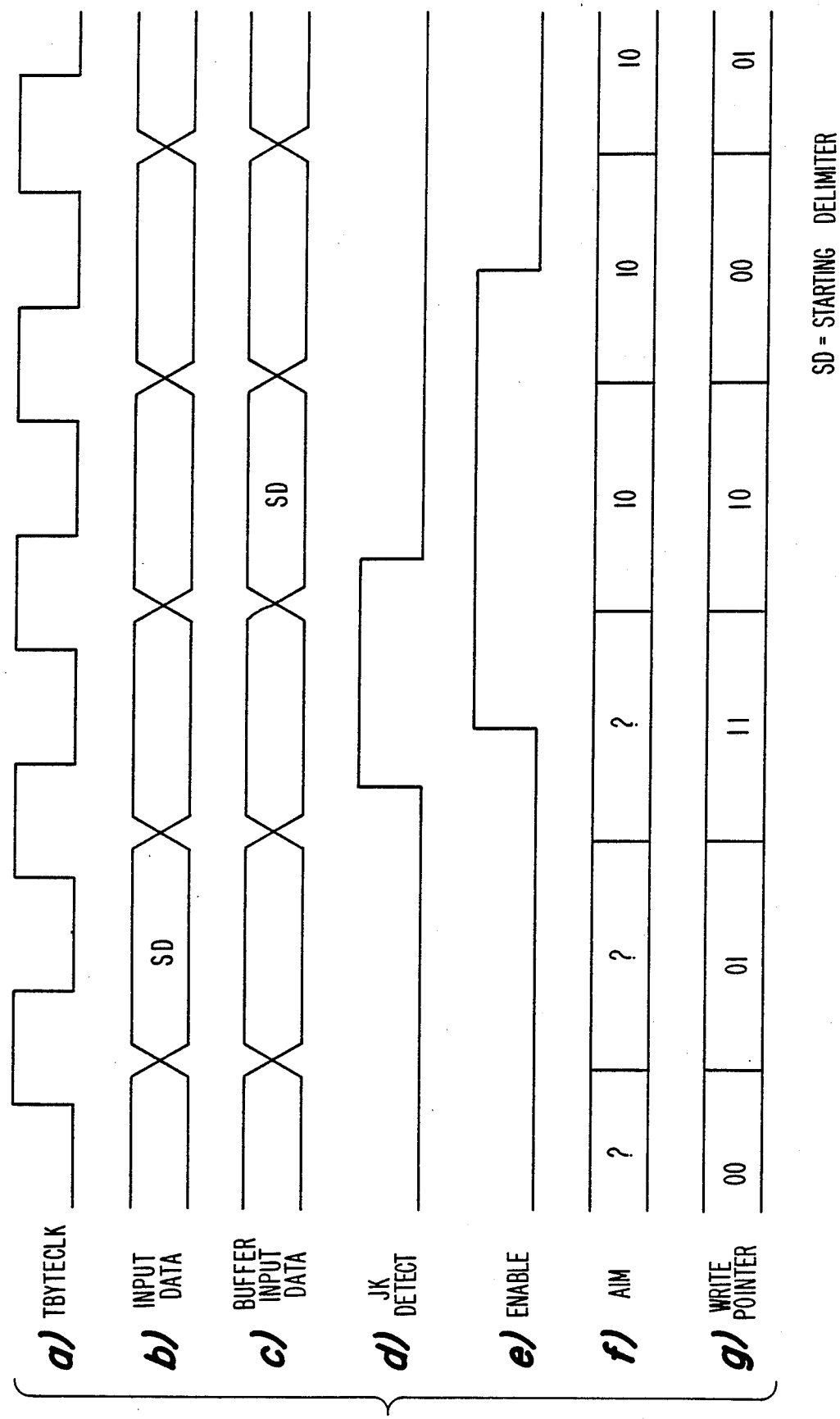
FIG. 15 is a write pointer timing chart.
Figure 16:
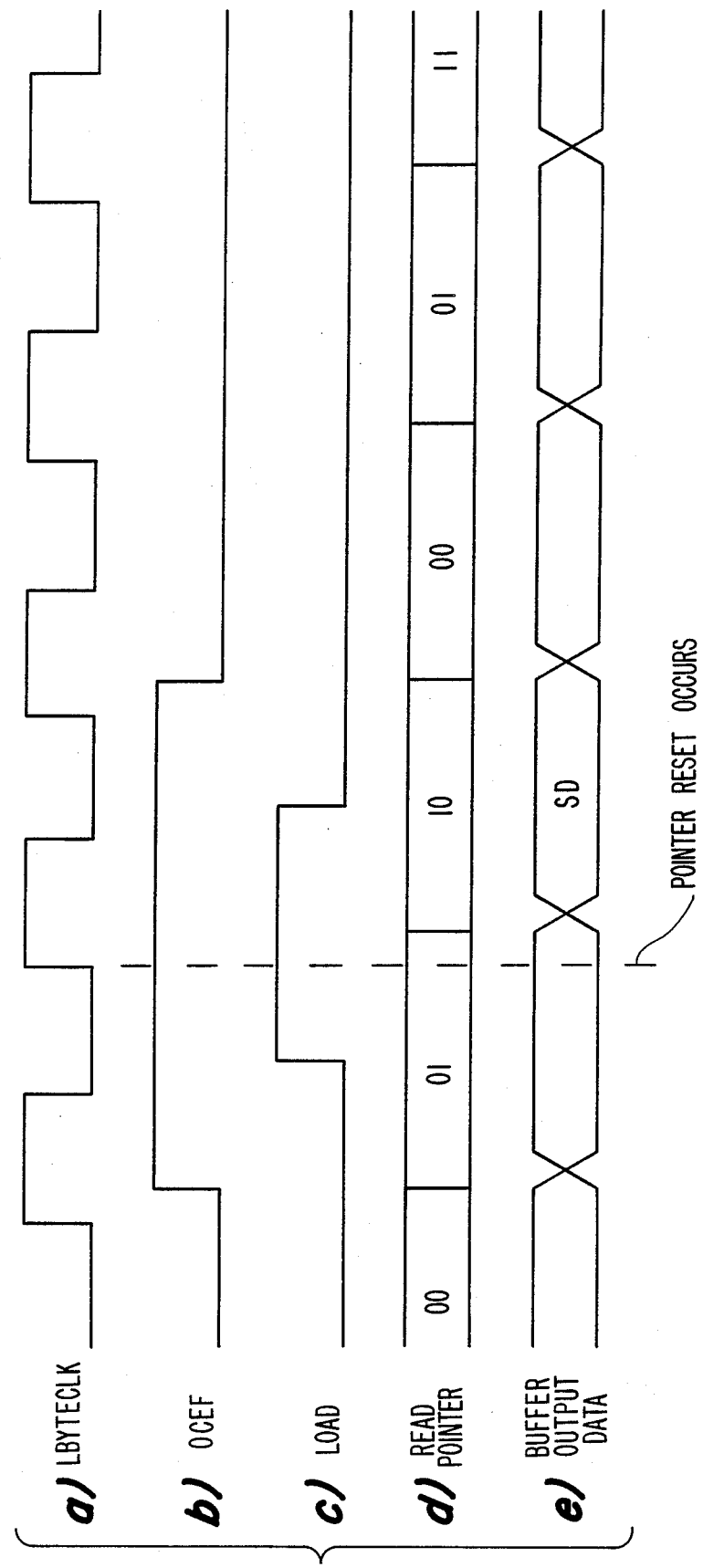
FIG. 16 is a read pointer timing chart.

Timing charts are shown in FIGS. 15 and 16 that illustrate the timing of the selection of write and read addresses by the write and read pointers. For purposes of this description, the elasticity buffer is assumed to contain only four storage elements, so that the input and output pointer counts contain only two bits. As shown in lines (a)-(g) of FIG. 15, at the same time that the starting delimiter for a new frame of data is written into the storage element (line c) designated by write address 10, this write address is stored in the temporary address memory (line f), and an enable signal (line e) is provided to a synchronizer, where it is retimed in accordance with the local byte clock signal. The reclocked enable signal corresponds to the OCEF signal (line b) provided by the synchronizer and shown in FIG. 16. After the read controller receives the output controller enable flag signal, a load signal (line c) is provided to the read pointer. The load signal received by the read pointer causes the read pointer (line d) to initialize in response to the next local byte clock signal, and the read pointer selects as the read address the initialization address 10 stored in the temporary address memory. As a result, the storage element containing the starting delimiter for the new frame of data is selected by the read pointer. One byte time later, the starting delimiter is read out of the storage element (line e). Initialization of the elasticity buffer occurs in such a manner that the starting delimiter of the new frame is read no sooner than fifteen bit times after it is written into a storage element. Due to the uncertainty in synchronization of up to one byte time, the starting delimiter will be read out after a delay of between fifteen and twenty-five bit times. Thus, initialization at the start of each new frame guarantees a minimum of fifteen bits of pre-buffering and post-buffering.

It will be apparent to those skilled in the art that various modifications and variations can be made in the elasticity buffer of the present invention without departing from the scope or spirit of the invention. As some examples, the apparatus may be implemented using other circuit components or even software, the node may be included in various types of data communication systems, and the units used may be symbols instead of bytes. Thus, it is intended that the present invention cover any modifications and variations of this invention provided they come within the scope of the appended claims and their equivalents.

What is claimed is:

1. A parallel asynchronous elasticity buffer in a repeater node for transferring data in a data communication system, the data communication system including a plurality of nodes coupled in a network for transferring frames of data from a source node to a destination node through the repeater node, wherein the repeater node receives a plurality of bits of data in a frame from an upstream node and transmits the plurality of bits of data in the frame to a downstream node, and wherein each node in the network transmits data in synchronism with an independent clock, the elasticity buffer comprising:

receiving means for providing in parallel format, in response to a transmit multibit clock signal that is in synchronism with an independent clock of the upstream node, a multibit data unit received from the upstream node;

storage means including a fixed number of multibit storage elements, coupled to the receiving means, for storing the multibit data unit in parallel format in one of the storage elements, wherein each storage element has a unique address;

transmitting means, coupled to the storage means, for outputting in parallel format, in response to a local multibit clock signal that is in synchronism with the independent clock of the repeater node, one of the multibit data units stored in the storage means;

write pointer means, coupled to the storage means, for selecting as a write address the address of a storage element to store the next multibit data unit provided by the receiving means;

read pointer means, coupled to the storage means, for selecting as a read address the address of a storage element to provide the next multibit data unit output by the transmitting means, wherein each multibit data unit is output in first-in, first-out order;

initialization means for initializing the elasticity buffer to prevent simultaneous selection of the same address as a read address and a write address, wherein in response to initialization, a write address is selected as a read address after a predetermined delay; and detection means for detecting whether an error condition corresponding to a write overflow or read underrun of a storage element is impending by determining whether the same address is selected as the write address and as the read address during an overlap time period having a duration equal to a threshold time period.

2. An elasticity buffer in accordance with claim 1, wherein the threshold time period is unequal in duration to an integer multiple of the period of the local multibit clock signal.

3. An elasticity buffer in accordance with claim 2, wherein the write pointer means comprises a counter.

4. An elasticity buffer in accordance with claim 3, wherein the read pointer means comprises a counter.

5. An elasticity buffer in accordance with claim 4, wherein the write and read pointer means comprise gray code counters.

6. An elasticity buffer in accordance with claim 2, wherein the read pointer means comprises a counter.

7. An elasticity buffer in accordance with claim 2, wherein:
the elasticity buffer further comprises means for providing a sampling clock signal; and
the detection means comprises comparator means for comparing, in response to the sampling clock signal, the write address and the read address.

8. An elasticity buffer in accordance with claim 7, wherein the sampling clock signal is in synchronism with the local multibit clock signal.

9. An elasticity buffer in accordance with claim 8, wherein the sampling clock signal is between 135 degrees and 225 degrees out of phase with the local multibit clock signal.

10. An elasticity buffer in accordance with claim 8, wherein the sampling clock signal is between 225 degrees and 315 degrees out of phase with the local multibit clock signal.

11. An elasticity buffer in accordance with claim 7, wherein the sampling clock signal providing means provides a first sampling clock signal to detect whether a write overflow is impending and provides a second sampling clock signal out of phase with the first sampling clock signal to detect whether a read underrun is impending.

12. An elasticity buffer in accordance with claim 11, wherein the second sampling clock signal is between 135 degrees and 225 degrees out of phase with the local multibit clock signal, and the first sampling clock signal is between 225 degrees and 315 degrees out of phase with the local multibit clock signal.

13. An elasticity buffer in accordance with claim 2, wherein:
the elasticity buffer further comprises memory means for storing at least one initialization address; and
at least one of the write pointer means and the read pointer means, in response to a control signal from the initialization means, selects an initialization address stored in the memory means.

14. An elasticity buffer in accordance with claim 13, wherein:
the elasticity buffer further comprises means for detecting receipt by the repeater node of a first multibit data unit of a frame from the upstream node; and
the memory means, in response to detection of the first multibit data unit of the frame, stores from the write pointer means as the initialization address for the read pointer means the write address corresponding to the storage element selected to store the first multibit data unit.

15. An elasticity buffer in accordance with claim 1, wherein the threshold time period is shorter in duration than the period of the local multibit clock signal.

16. An elasticity buffer in accordance with claim 15, wherein the write pointer means comprises a counter.

17. An elasticity buffer in accordance with claim 16, wherein the read pointer means comprises a counter.

18. An elasticity buffer in accordance with claim 17, wherein the write and read pointer means comprise gray code counters.

19. An elasticity buffer in accordance with claim 15, wherein:
the elasticity buffer further comprises memory means for storing at least one initialization address; and
at least one of the write pointer means and the read pointer means, in response to a control signal from the initialization means, selects an initialization address stored in the memory means.

20. An elasticity buffer in accordance with claim 19, wherein:
the elasticity buffer further comprises means for detecting receipt by the repeater node of a first multibit data unit of a frame from the upstream node; and
the memory means, in response to detection of the first multibit data unit of the frame, stores from the write pointer means as the initialization address for the read pointer means the write address corresponding to the storage element selected to store the first multibit data unit.

21. An elasticity buffer in accordance with claim 15, wherein the network comprises a token ring.

22. An elasticity buffer in accordance with claim 21, wherein the network comprises an FDDI network.

23. An elasticity buffer in accordance with claim 22, wherein the multibit data unit comprises a byte.

24. An elasticity buffer in accordance with claim 22, wherein the multibit data unit comprises a symbol.

25. An elasticity buffer in accordance with claim 15, wherein the read pointer means comprises a counter.

26. An elasticity buffer in accordance with claim 15, wherein:
the elasticity buffer further comprises means for providing a sampling clock signal; and
the detection means comprises comparator means for comparing, in response to the sampling clock signal, the write address and the read address.

27. An elasticity buffer in accordacne with claim 26, wherein the sampling clock signal is in synchronism with the local multibit clock signal.

28. An elasticity buffer in accordance with claim 27, wherein the sampling clock signal is between 135 degrees and 225 degrees out of phase with the local multibit clock signal.

29. An elasticity buffer in accordance with claim 27, wherein the sampling clock signal is between 225 degrees and 315 degrees out of phase with the local multibit clock signal.

30. An elasticity buffer in accordance with claim 26, wherein the sampling clock signal providing means provides a first sampling clock signal to detect whether a write overflow is impending and provides a second sampling clock signal out of phase with the first sampling clock signal to detect whether a read underrun is impending.

31. An elasticity buffer in accordance with claim 30, wherein the second sampling clock signal is between 135 degrees and 225 degrees out of phase with the local multibit clock signal, and the first sampling clock signal is between 225 degrees and 315 degrees out of phase with the local multibit clock signal.

32. An elasticity buffer in accordance with claim 30, wherein:

the elasticity buffer further comprises memory means for storing at least one initialization address; and at least one of the write pointer means and the read pointer means, in response to a control signal from the initialization means, selects an initialization address stored in the memory means.

33. An elasticity buffer in accordance with claim 32, wherein:

the elasticity buffer further comprises means for detecting receipt by the repeater node of a first multibit data unit of a frame from the upstream mode; and the memory means, in response to detection of the first multibit data unit of the frame, stores from the write pointer means as the initialization address for the read pointer means the write address corresponding to the storage element selected to store the first multibit data unit.

34. An elasticity buffer in accordance with claim 30, wherein the network comprises a token ring.

35. An elasticity buffer in accordance with claim 34, wherein the network comprises an FDDI network.

36. An elasticity buffer in accordance with claim 35, wherein the multibit data unit comprises a byte.

37. An elasticity buffer in accordance with claim 35, wherein the multibit data unit comprises a symbol.

38. An elasticity buffer in accordance with claim 26, wherein:

the elasticity buffer further comprises memory means for storing at least one initialization address; and at least one of the write pointer means and the read pointer means, in response to a control signal from the initialization means, selects an initialization address stored in the memory means.

39. An elasticity buffer in accordance with claim 38, wherein:

the elasticity buffer further comprises means for detecting receipt by the repeater node of a first multibit data unit of a frame from the upstream mode; and the memory means, in response to detection of the first multibit data unit of the frame, stores from the write pointer means as the initialization address for the read pointer means the write address corresponding to the storage element selected to store the first multibit data unit.

40. An elasticity buffer in accordance with claim 1, wherein the write pointer means comprises a counter.

41. An elasticity buffer in accordance with claim 40, wherein the read pointer means comprises a counter.

42. An elasticity buffer in accordance with claim 41, wherein the write and read pointer means comprise gray code counters.

43. An elasticity buffer in accordance with claim 42, wherein:

the elasticity buffer further comprises means for providing a sampling clock signal; and the detection means comprises comparator means for comparing, in response to the sampling clock signal, the write address and the read address.

44. An elasticity buffer in accordance with claim 43, wherein the sampling clock signal is in synchronism with the local multibit clock signal.

45. An elasticity buffer in accordance with claim 43, wherein the sampling clock signal providing means provides a first sampling clock signal to detect whether a write overflow is impending and provides a second sampling clock signal out of phase with the first sampling clock signal to detect whether a read underrun is impending.

46. An elasticity buffer in accordance with claim 41, wherein:

the elasticity buffer further comprises means for providing a sampling clock signal; and the detection means comprises comparator means for comparing, in response to the sampling clock signal, the write address and the read address.

47. An elasticity buffer in accordance with claim 46, wherein the sampling clock signal is in synchronism with the local multibit clock signal.

48. An elasticity buffer in accordance with claim 46, wherein the sampling clock signal providing means provides a first sampling clock signal to detect whether a write overflow is impending and provides a second sampling clock signal out of phase with the first sampling clock signal to detect whether a read underrun is impending.

49. An elasticity buffer in accordance with claim 1, wherein the read pointer means comprises a counter.

50. An elasticity buffer in accordance with claim 1, wherein:

the elasticity buffer further comprises means for providing a sampling clock signal; and the detection means comprises comparator means for comparing, in response to the sampling clock signal, the write address and the read address.

51. An elasticity buffer in accordance with claim 50, wherein the sampling clock signal is in synchronism with the local multibit clock signal.

52. An elasticity buffer in accordance with claim 51, wherein the sampling clock signal is between 135 degrees and 225 degrees out of phase with the local multibit clock signal.

53. An elasticity buffer in accordance with claim 51, wherein the sampling clock signal is between 225 degrees and 315 degrees out of phase with the local multibit clock signal.

54. An elasticity buffer in accordance with claim 50, wherein the sampling clock signal providing means provides a first sampling clock signal to detect whether a write overflow is impending and provides a second sampling clock signal out of phase with the first sampling clock signal to detect whether a read underrun is impending.

55. An elasticity buffer in accordance with claim 54, wherein the second sampling clock signal is between 135 degrees and 225 degrees out of phase with the local multibit clock signal, and the first sampling clock signal is between 225 degrees and 315 degrees out of phase with the local multibit clock signal.

56. An elasticity buffer in accordance with claim 54, wherein:

the elasticity buffer further comprises memory means for storing at least one initialization address; and at least one of the write pointer means and the read pointer means, in response to a control signal from the initialization means, selects an initialization address stored in the memory means.

57. An elasticity buffer in accordance with claim 56, wherein:

the elasticity buffer further comprises means for detecting receipt by the repeater node of a first multibit data unit of a frame from the upstream node; and the memory means, in response to detection of the first multibit data unit of the frame, stores from the write pointer means as the initialization address for the read pointer means the write address corresponding to the storage element selected to store the first multibit data unit.

58. An elasticity buffer in accordance with claim 50, wherein:
the elasticity buffer further comprises memory means for storing at least one initialization address; and
at least one of the write pointer means and the read pointer means, in response to a control signal from the initialization means, selects an initialization address stored in the memory means.

59. An elasticity buffer in accordance with claim 58, wherein:
the elasticity buffer further comprises means for detecting receipt by the repeater node of a first multibit data unit of a frame from the upstream node; and
the memory means, in response to detection of the first multibit data unit of the frame, stores from the write pointer means as the initialization address for the read pointer means the write address corresponding to the storage element selected to store the first multibit data unit.

60. An elasticity buffer in accordance with claim 1, wherein:
the elasticity buffer further comprises memory means for storing at least one initialization address; and
at least one of the write pointer means and the read pointer means, in response to a control signal from the initialization means, selects an initialization address stored in the memory means.

61. An elasticity buffer in accordance with claim 60, wherein:
the elasticity buffer further comprises means for detecting receipt by the repeater node of a first multibit data unit of a frame from the upstream node; and
the memory means, in response to detection of the first multibit data unit of the frame, stores from the write pointer means as the initialization address for the read pointer means the write address corresponding to the storage element selected to store the first multibit data unit.

62. A method for transferring data in a data communication system via a repeater node having a parallel asynchronous elasticity buffer, the elasticity buffer including storage means having a fixed number of multibit storage elements, each storage element having a unique address, and the data communication system including a plurality of nodes coupled in a network for transferring frames of data from a source node to a destination node through the repeater node, wherein the repeater node receives a plurality of bits of data in a frame from an upstream node and transmits the plurality of bits of data in the frame to a downstream node, and wherein each node in the network transmits data in synchronism with an independent clock, the method comprising the following steps performed by the repeater node:
providing in parallel format to the storage means, in response to a transmit multibit clock signal that is in synchronism with an independent clock of the upstream node, a multibit data unit received from the upstream node;
storing the multibit data unit in parallel format in one of the storage elements;
outputting in parallel format from the storage means, in response to a local multibit clock signal that is in synchronism with the independent clock of the repeater node, one of the multibit data units stored in the storage means;
selecting as a write address the address of a storage element to store the next multibit data unit provided to the storage means;
selecting as a read address the address of a storage element to provide the next multibit data unit output by the storage means, wherein each multibit data unit is output in first-in, first-out order;
initializing the elasticity buffer to prevent simultaneous selection of the same address as a read address and a write address, wherein in response to initialization, a write address is selected as a read address after a predetermined delay; and
detecting whether an error condition corresponding to a write overflow or read underrun of a storage element is impending by determining whether the same address is selected as the write address and as the read address during an overlap time period having a duration equal to a threshold time period.

63. A method in accordance with claim 62, wherein the threshold time period is unequal in duration to an integer multiple of the period of the local multibit clock signal.

64. A method in accordance with claim 62, wherein the threshold time period is shorter in duration than the period of the local multibit clock signal.

65. A method in accordance with claim 64, wherein:
the method further comprises providing a sampling clock signal; and
the detecting step comprises comparing, in response to the sampling clock signal, the write address and the read address.

66. A method in accordance with claim 65, wherein the sampling clock signal is in synchronism with the local multibit clock signal.

67. A method in accordance with claim 66, wherein the sampling clock signal is between 135 degrees and 225 degrees out of phase with the local multibit clock signal.

68. A method in accordance with claim 66, wherein the sampling clock signal is between 225 degrees and 315 degrees out of phase with the local multibit clock signal.

69. A method in accordance with claim 65, wherein the sampling clock signal providing step comprises providing a first sampling clock signal to detect whether a write overflow is impending and providing a second sampling clock signal out of phase with the first sampling clock signal to detect whether a read underrun is impending.

70. A method in accordance with claim 69, wherein the second sampling clock signal is between 135 degrees and 225 degrees out of phase with the local multibit clock signal, and the first sampling clock signal is between 225 degrees and 315 degrees out of phase with the local multibit clock signal.

71. A method in accordance with claim 69, wherein the method further comprises:
storing at least one initialization address; and
selecting, as at least one of the write address and the read address, a stored initialization address in response to a control signal.

72. A method in accordance with claim 71, wherein the method further comprises:

detecting receipt by the repeater node of a first multibit data unit of a frame from the upstream node; and storing as the initialization address to be selected as the read address, in response to detection of the first multibit data unit of the frame, the write address corresponding to the storage element selected to store the first multibit data unit.

73. A method in accordance with claim 65, wherein the method further comprises:

storing at least one initialization address; and selecting, as at least one of the write address and the read address, a stored initialization address in response to a control signal.

74. A method in accordance with claim 73, wherein the method further comprises:

detecting receipt by the repeater node of a first multibit data unit of a frame from the upstream node; and storing as the initialization address to be selected as the read address, in response to detection of the first multibit data unit of the frame, the write address corresponding to the storage element selected to store the first multibit data unit.

75. A method in accordance with claim 64, wherein the method further comprises:

storing at least one initialization address; and selecting, as at least one of the write address and the read address, a stored initialization address in response to a control signal.

76. A method in accordance with claim 75, wherein the method further comprises:

detecting receipt by the repeater node of a first multibit data unit of a frame from the upstream node; and storing as the initialization address to be selected as the read address, in response to detection of the first multibit data unit of the frame, the write address corresponding to the storage element selected to store the first multibit data unit.

77. A method in accordance with claim 62, wherein the method further comprises:

storing at least one initialization address; and selecting, as at least one of the write address and the read address, a stored initialization address in response to a control signal.

78. A method in accordance with claim 77, wherein the method further comprises:

detecting receipt by the repeater node of a first multibit data unit of a frame from the upstream node; and storing as the initialization address to be selected as the read address, in response to detection of the first multibit data unit of the frame, the write address corresponding to the storage element selected to store the first multibit data unit.

79. A method in accordance with claim 62, wherein:

the method further comprises providing a sampling clock signal; and the detecting step comprises comparing, in response to the sampling clock signal, the write address and the read address.

80. A method in accordance with claim 79, wherein the sampling clock signal is in synchronism with the local multibit clock signal.

81. A method in accordance with claim 80, wherein the sampling clock signal is between 135 degrees and 225 degrees out of phase with the local multibit clock signal.

82. A method in accordance with claim 80, wherein the sampling clock signal is between 225 degrees and 315 degrees out of phase with the local multibit clock signal.

83. A method in accordance with claim 79, wherein the sampling clock signal providing step comprises providing a first sampling clock signal to detect whether a write overflow is impending and providing a second sampling clock signal out of phase with the first sampling clock signal to detect whether a read underrun is impending.

84. A method in accordance with claim 83, wherein the second sampling clock signal is between 135 degrees and 225 degrees out of phase with the local multibit clock signal, and the first sampling clock signal is between 225 degrees and 315 degrees out of phase with the local multibit clock signal.

85. A method in accordance with claim 62, wherein the network comprises a token ring.

86. A method in accordance with claim 85, wherein the network comprises an FDDI network.

87. A method in accordance with claim 86, wherein the multibit data unit comprises a byte.

88. A method in accordance with claim 86, wherein the multibit data unit comprises a symbol.

* * * * *